United States Patent
Jia

(10) Patent No.: US 12,230,985 B2
(45) Date of Patent: *Feb. 18, 2025

(54) SWITCHED MULTI-CELL BATTERY SYSTEM

(71) Applicant: Google LLC, Mountain View, CA (US)

(72) Inventor: Liang Jia, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,318

(22) Filed: Jan. 23, 2024

(65) Prior Publication Data

US 2024/0162726 A1    May 16, 2024

Related U.S. Application Data

(63) Continuation of application No. 17/281,524, filed as application No. PCT/US2019/066330 on Dec. 13, 2019, now Pat. No. 11,923,706.

(60) Provisional application No. 62/905,650, filed on Sep. 25, 2019.

(51) Int. Cl.
*H02J 7/00* (2006.01)

(52) U.S. Cl.
CPC .......... *H02J 7/0024* (2013.01); *H02J 7/0016* (2013.01); *H02J 7/0019* (2013.01); *H02J 7/0029* (2013.01)

(58) Field of Classification Search
CPC ...... H02J 7/0024; H02J 7/0016; H02J 7/0019; H02J 7/0029; H02J 7/0025
USPC ....................................................... 320/117
See application file for complete search history.

(56) References Cited

U.S. PATENT DOCUMENTS

| | | | |
|---|---|---|---|
| 3,286,152 A | 11/1966 | Noe | |
| 5,764,032 A | 6/1998 | Moore | |
| 8,598,849 B2 | 12/2013 | Bhardwaj et al. | |
| 9,077,198 B2 | 7/2015 | Szepesi | |
| 9,300,157 B2 | 3/2016 | Bergqvist et al. | |
| 11,923,706 B2 | 3/2024 | Jia | |

(Continued)

FOREIGN PATENT DOCUMENTS

| | | |
|---|---|---|
| CN | 101232193 | 7/2008 |
| CN | 102570536 | 7/2012 |
| WO | 2017102414 | 6/2017 |
| WO | 2021061175 | 4/2021 |

OTHER PUBLICATIONS

"Foreign Office Action", CN Application No. 201980097260.6, Jul. 20, 2023, 11 pages.

(Continued)

*Primary Examiner* — Paul Dinh
(74) *Attorney, Agent, or Firm* — Colby Nipper PLLC

(57) ABSTRACT

This disclosure describes apparatuses and techniques for a switched multi-cell battery system for electronic devices. In some aspects, a switched multi-cell battery system may transfer, via a plurality of power control switches electrical power from a power adapter to components of the electronic device by charging battery cells in series and by discharging the battery cells in parallel or as a single battery cell. As a result, the switched multi-cell battery system may reduce or eliminate a voltage step-down conversion stage to increase a power-transfer efficiency of an electronic device. By doing so, charging times may be reduced or operating times may be increased, thereby improving users' experience with their electronic devices.

20 Claims, 16 Drawing Sheets

(56) References Cited

U.S. PATENT DOCUMENTS

| | | | |
|---|---|---|---|
| 2006/0092583 A1 | 5/2006 | Alahmad et al. | |
| 2008/0054327 A1 | 3/2008 | Johnson | |
| 2008/0180059 A1 | 7/2008 | Carrier et al. | |
| 2013/0241494 A1 | 9/2013 | Bhardwaj et al. | |
| 2013/0314054 A1 | 11/2013 | Bergqvist et al. | |
| 2014/0062388 A1 | 3/2014 | Kim | |
| 2014/0184173 A1 | 7/2014 | Szepesi | |
| 2016/0365740 A1 | 12/2016 | Wang | |
| 2018/0109122 A1 | 4/2018 | Koerner | |
| 2018/0219390 A1* | 8/2018 | Tkachenko | H02J 7/0016 |
| 2021/0091576 A1 | 3/2021 | Zhang | |
| 2022/0123564 A1 | 4/2022 | Jia | |
| 2023/0134512 A1* | 5/2023 | Muramatsu | H02J 7/0024 |
| | | | 320/137 |

OTHER PUBLICATIONS

"International Preliminary Report on Patentability", Application No. PCT/US2019/066330, Mar. 15, 2022, 10 pages.

"International Search Report and Written Opinion", Application No. PCT/US2019/066330, Apr. 22, 20, 17 pages.

"Notice of Allowance", U.S. Appl. No. 17/281,524, Oct. 17, 2023, 8 pages.

"Restriction Requirement", U.S. Appl. No. 17/281,524 Sep. 15, 2023, 6 pages.

Pelosi, Alex, "System for Identifying Optimal Transition Points Between Charge Tiers of a Battery Pack", Technical Disclosure Commons; Retrieved from https://www.tdcommons.org/dpubs_series/3492, Aug. 4, 2020, 8 pages.

"Extended European Search Report", EP Application No. 23201709.5, Feb. 5, 2024, 9 pages.

* cited by examiner

SWITCHED MULTI-CELL BATTERY SYSTEM

RELATED APPLICATION(S)

This application is a continuation of and claims priority to U.S. Non-Provisional application Ser. No. 17/281,524, filed Mar. 30, 2021, which is a National Stage Entry of International Application No. PCT/US2019/066330, filed Dec. 13, 2019, which claims the benefit of U.S. Provisional Application No. 62/905,650, filed Sep. 25, 2019, the contents of which are hereby incorporated by reference in their entirety.

BACKGROUND

Mobile electronic devices are frequently powered by at least one rechargeable battery when the device is not plugged into a power source. When the electronic device is plugged into the power source, the battery can be charged. To do so, electric power flows from the power source through a power adapter that supplies power to a charging circuit of the electronic device. Through an electric power conversion process, the power adapter converts electric energy from one form to another, for example converting between alternating current (AC) and direct current (DC), changing the voltage, changing the frequency, or combinations of these. The charging circuit supplies energy to the battery, which, over time, charges the battery. An amount of time needed to recharge the electronic device's battery, however, can be undesirably long. Alternately, if the battery is quick to charge (e.g., a small battery) but does not hold sufficient power, the operating time of the electronic device on a single battery charge can be short. Therefore, as users typically desire short charging times and long operating times, conventional battery systems often fail to meet these objectives.

In some cases, conventional battery systems are unable to quickly charge or maintain sufficient power to support long operating times due to energy loss during electric power conversion (e.g., voltage conversion), which is often manifested as thermal energy (heat). For example, voltage conversion is present at various stages of power conversion and use, such as at the power adapter, rechargeable battery, and power supplies for components of the electronic device. Accordingly, this inefficiency or energy loss at each stage of power conversion, such as from the power adapter to the rechargeable battery or from the rechargeable battery to the components of the electronic device, may increase battery charge time or decrease device operating time, resulting in user frustration or an impaired user experience.

SUMMARY

This disclosure describes apparatuses and techniques for a switched multi-cell battery system for electronic devices. In some aspects, a switched multi-cell battery system may transfer, via a plurality of power control switches, electrical power from a power adapter to components of an electronic device by charging battery cells in series and by discharging the battery cells in parallel or as a single battery cell. As a result, the switched multi-cell battery system may reduce or eliminate a voltage step-down conversion stage to increase a power-transfer efficiency of the electronic device. By doing so, charging times may be reduced and/or operating times on one battery charge may be increased.

In some aspects, a switched multi-cell battery system for an electronic device comprises an input voltage node, an output voltage node, a ground node, and a plurality of rechargeable battery cells comprising at least a first rechargeable battery cell with a positive terminal and a negative terminal and a second rechargeable battery cell with a positive terminal and a negative terminal. The switched multi-cell battery system also includes a plurality of power control switches comprising a first power control switch having a gate terminal, a first channel terminal coupled to the input voltage node, and a second channel terminal coupled to the positive terminal of the first rechargeable battery cell and a second power control switch having a gate terminal, a first channel terminal coupled to the second channel terminal of the first power control switch, and a second channel terminal coupled to the output voltage node. The plurality of power control switches also includes a third power control switch having a gate terminal, a first channel terminal coupled to the second channel terminal of the second power control switch, and a second channel terminal and a fourth power control switch having a gate terminal, a first channel terminal coupled to the second channel terminal of the third power control switch, and a second channel terminal coupled to the ground node. A fifth power control switch of the plurality of power control switches has a gate terminal, a first channel terminal coupled to the input voltage node, and a second channel terminal coupled to the positive terminal of the second rechargeable battery cell. A sixth power control switch of the plurality of power control switches has a gate terminal, a first channel terminal coupled to the second channel terminal of the fifth power control switch, and a second channel terminal coupled to the output voltage node. The plurality of power control switches also includes a seventh power control switch having a gate terminal, a first channel terminal coupled to the second channel terminal of the sixth power control switch, and a second channel terminal and an eighth power control switch having a gate terminal, a first channel terminal coupled to the second channel terminal of the seventh power control switch, and a second channel terminal coupled to the ground node.

In other aspects, a switched multi-cell battery system for an electronic device comprises an input voltage node, an output voltage node, a ground node, and a plurality of rechargeable battery cells comprising at least a first rechargeable battery cell with a positive terminal and a negative terminal and a second rechargeable battery cell with a positive terminal and a negative terminal. The switched multi-cell battery system also includes a plurality of power control switches comprising a first power control switch having a gate terminal, a first channel terminal coupled to the input voltage node, and a second channel terminal coupled to the positive terminal of the first rechargeable battery cell and a second power control switch having a gate terminal, a first channel terminal coupled to the second channel terminal of the first power control switch, and a second channel terminal coupled to the output voltage node. The plurality of power control switches also includes third and fourth power control switches coupled between the second channel terminal of the second power control switch and the ground node. A fifth power control switch of the plurality of power control switches has a gate terminal, a first channel terminal coupled to the input voltage node, and a second channel terminal coupled to the positive terminal of the second rechargeable battery cell. A sixth power control switch of the plurality of power control switches has a gate terminal, a first channel terminal coupled to the second channel terminal of the fifth power control switch, and a second channel terminal coupled to the output voltage node. The plurality of power control switches also includes seventh and eighth power control switches coupled between the second channel terminal of the sixth power control switch and the ground node. The switched multi-cell battery system also includes a power management integrated controller configured to, during a first phase of a duty cycle, control the plurality of power control switches effective to (i) couple the first and second rechargeable battery cells in series between the input voltage node and the ground node and (ii) couple the second rechargeable battery cell between the output voltage node and the ground node. The power management integrated controller is further configured to, during a second phase of the duty cycle, control the plurality of power control switches effective to (i) couple the first and second rechargeable battery cells in series between the input voltage node and the ground node and (ii) couple the first rechargeable battery cell between the output voltage node and the ground node.

In yet other aspects, a method for charging and discharging a switched multi-cell battery system comprises closing, based on a first phase of a duty cycle, each of a first plurality of power control switches to enable flow of current as part of establishing a first operating state. The method also includes opening, based on the first phase of the duty cycle, each of a second plurality of power control switches to disable flow of current as part of establishing the first operating state in which electrical power from an external power adapter charges a first rechargeable battery cell and a second rechargeable battery cell that are connected, by at least one of the first plurality of power control switches, in series between an input voltage node and a ground node, and a charge stored in the second battery rechargeable cell flows, through at least one of the first plurality of power control switches, to components of an electronic device. Based on a second phase of the duty cycle, the method closes each of the second plurality of power control switches to enable flow of current as part of establishing a second operating state. The method also includes opening, based on a second phase of the duty cycle, each of the first plurality of power control switches to disable flow of current as part of establishing the second operating state in which electrical power from the external power adapter charges the second rechargeable battery cell and the first rechargeable battery cell that are connected, by at least one of the second plurality of power control switches, in series between the input voltage node and the ground node, and charge stored in the first rechargeable battery cell flows, through at least one of the second plurality of power control switches, to the components of the electronic device.

The details of one or more implementations of a switched multi-cell battery system are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

Apparatuses, methods, and techniques for a switched multi-cell battery system for electronic devices are described with reference to the following drawings. The same numbers are used throughout the drawings to reference like features and components.

DETAILED DESCRIPTION

Overview

This document describes apparatuses, methods, and techniques for switched multi-cell battery systems for electronic devices. Generally, a switched multi-cell battery system can be utilized to power an electronic device when the electronic device is not electrically connected to (e.g., plugged into) a power source (e.g., an external or an alternating current (AC) power supply). In various aspects, the switched multi-cell battery system includes an input voltage node, an output voltage node, a ground node, a plurality of power control switches, and a plurality of rechargeable battery cells. The rechargeable battery cells may include a first rechargeable battery cell and a second rechargeable battery cell. A power management integrated controller (PMIC) can be configured to control the power control switches to selectively enable or disable the flow of current during a first phase and a second phase of a duty cycle. For example, during the first phase of the duty cycle, the PMIC enables and/or disables each of the power control switches, such that the first and the second rechargeable battery cells are connected in series between the input voltage node and the ground node, and the second rechargeable battery cell is connected between the output voltage node and the ground node. During the second phase of the duty cycle, the PMIC enables and/or disables each of the power control switches, such that the first and the second rechargeable battery cells are connected in series between the input voltage node and the ground node, and the first rechargeable battery cell is connected between the output voltage node and the ground node. As set out above, the switched multi-cell battery system may reduce or eliminate a voltage step-down conversion stage to increase a power-transfer efficiency of an electronic device. By doing so, charging times may be reduced and/or operating times on one battery charge may be increased, thereby making mobile electronic/electrical devices more useful. Further, by appropriate choice of the relative durations of the first and second phases it is possible to control the proportion of a duty cycle for which the first battery cell transfers electrical power to the components of the electronic device and the proportion of a duty cycle for which the second battery cell transfers electrical power to the components of the electronic device.

While features and concepts of the described techniques, methods, and apparatuses for a switched multi-cell battery system for electronic devices can be implemented in any number of different environments, systems, devices, and/or various configurations, aspects of techniques, methods, and apparatuses for a switched multi-cell battery system for electronic devices are described in the context of the following example devices, systems, methods, and configurations.

Example Environment

Figure 1:
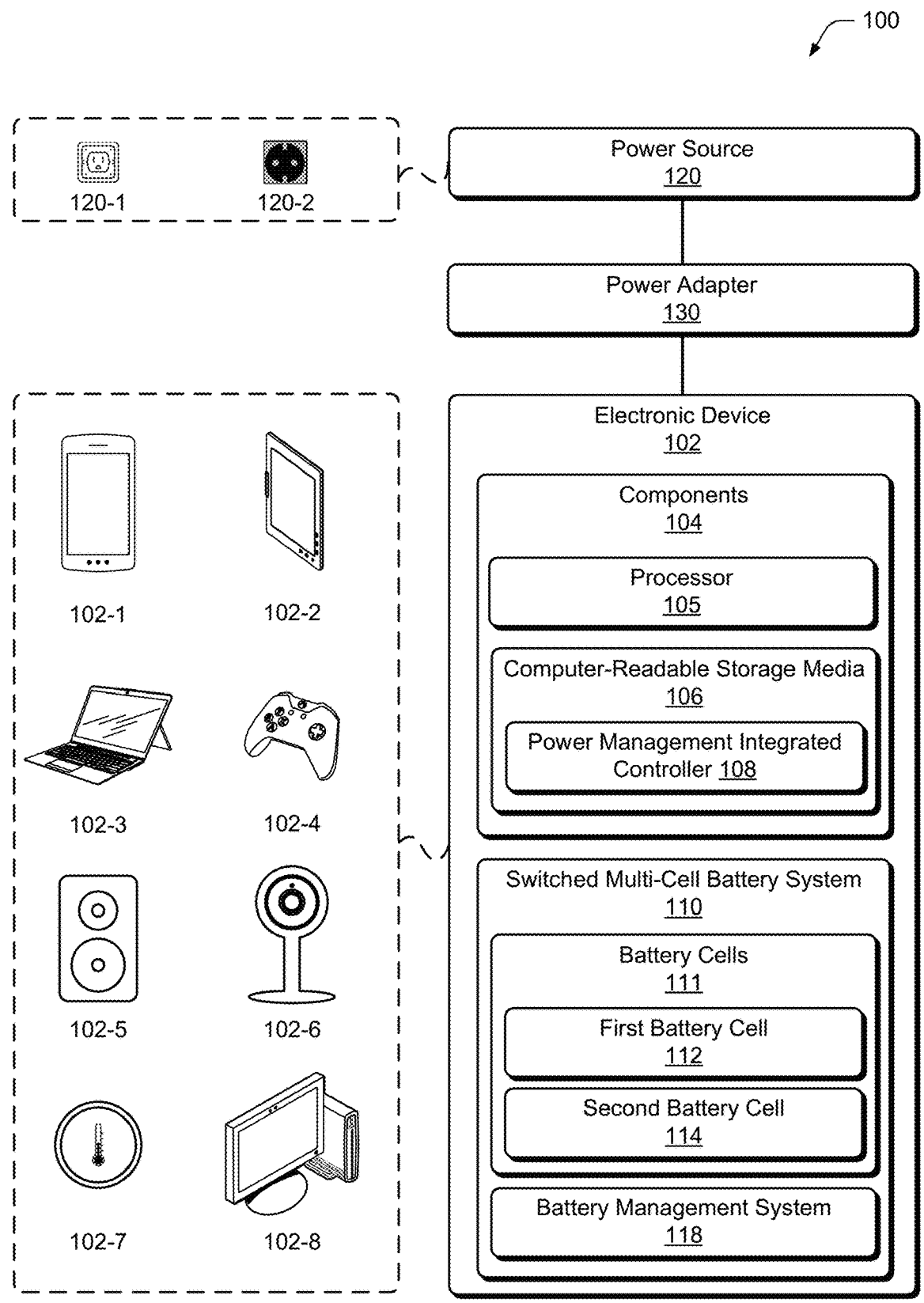
FIG. 1 illustrates an example operating environment including an electronic device with a switched multi-cell battery system.

FIG. 1 illustrates an example environment 100 that includes an electronic device 102, including a switched multi-cell battery system 110 (battery system 110). In the illustrated example environment 100, electrical power may flow from a power source 120, through a power adapter 130 (e.g., external power adapter), and to the battery system 110 of the electronic device 102. Generally, the power source 120 can be a single-phase 120 Volt (V)-60 Hertz (Hz) outlet 120-1 (e.g., in North America), a single-phase 230 V-50 Hz outlet 120-2 (e.g., in Europe), a direct current power source, and/or a power outlet with more than one phase (e.g., a two-phase voltage), a different voltage with a different frequency, and a different outlet-socket type (FIG. 1 illustrates two of many types of outlet sockets), depending on the country, state, and/or territory.

Figure 2:
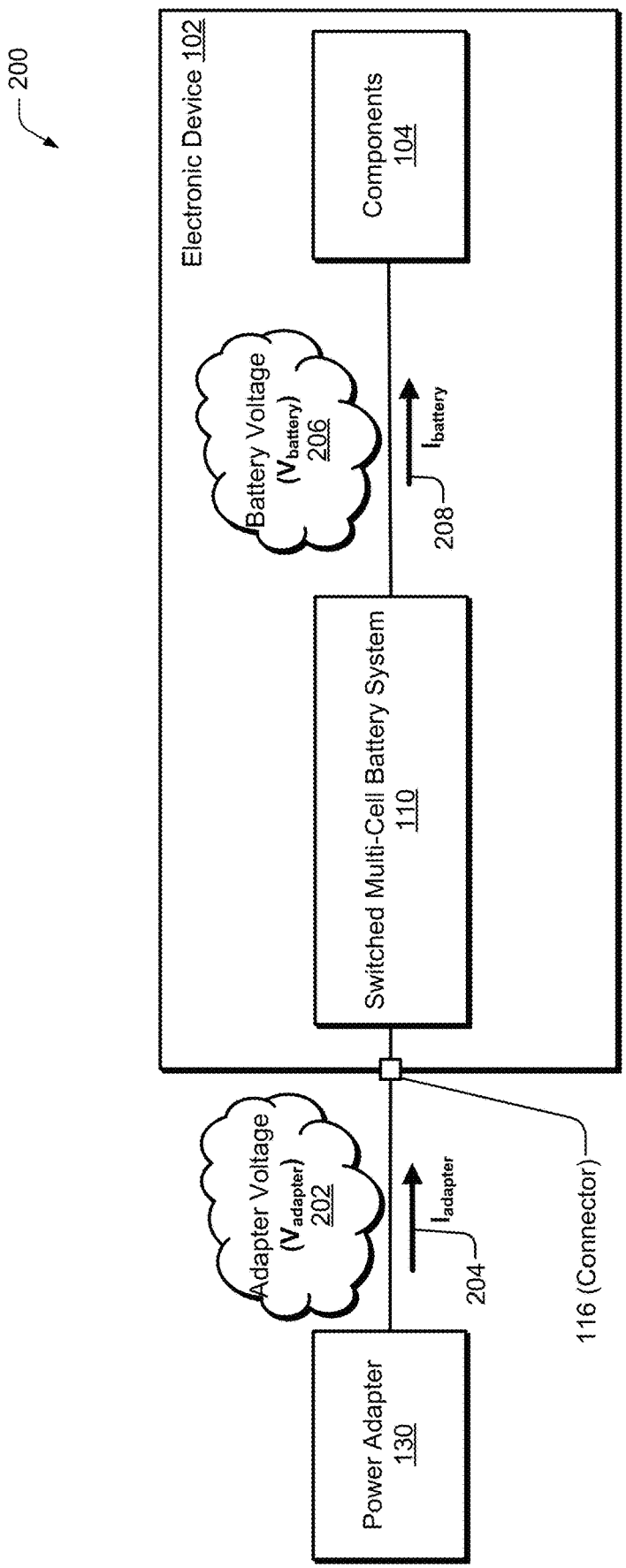
FIG. 2 illustrates a block diagram of an example environment, illustrating a power adapter coupled to a switched multi-cell battery system of an electronic device.

The power adapter 130 (e.g., alternating current (AC) adapter, alternating current to direct current (AC/DC) adapter, AC/DC converter) derives the voltage and power required by the electronic device 102 from a power source. Examples of a power adapter 130 include a wired power adapter containing an AC/DC converter and a wireless power transfer system (e.g., a Qi charger). In aspects where the power source 120 is a direct current power source, a power adapter 130 may not be utilized. The power adapter 130 can connect to the electronic device 102 at a connector 116, an example of which is illustrated in FIG. 2.

The electronic device 102 can be any suitable computing device or electronic device, including but not limited to, a smartphone 102-1, a tablet 102-2, a laptop 102-3, a gaming system 102-4, a smart speaker 102-5, a security camera 102-6, a smart thermostat 102-7, and a desktop computer 102-8. Other devices may also be used, such as home-service devices, baby monitors, routers, computing watches, computing glasses, drones, internet-of-things devices, health monitoring devices, netbooks, e-readers, home automation and control systems, and other computing devices that include rechargeable battery cell(s). The electronic device 102 can be wearable, non-wearable but mobile, or relatively immobile (e.g., computer desktop 102-8).

The electronic device 102 includes the battery system 110 for supplying power to components 104 of the electronic device 102. The battery system 110 includes a plurality of rechargeable battery cells 111 (e.g., a first battery cell 112, a second battery cell 114). As used herein, "rechargeable battery cells 111" may be defined as any battery capable of supplying power to the electronic device 102 provided that the charge within the rechargeable battery cells 111 that comprise the battery can be restored by applying a voltage potential across the terminals of the battery. Such cells include, but are not limited to, Nickel-Cadmium (NiCad), Nickel-Metal-Hydride (NiMH), Lithium-Ion (Li-Ion), and Lithium-Polymer based technologies.

In various aspects, the battery system 110 includes a battery management system 118. The battery management system 118 connects at each of the battery cells 111 (e.g., the first battery cell 112 and the second battery cell 114) and manages the charging and discharging of the battery cells 111. The battery management system 118 may sample voltage potentials across one or more of the battery cells 111 and provide measurements to the electronic device 102 for fuel-gauging purposes.

The components 104 of the electronic device 102 include one or more processor(s) 105, a computer-readable storage media 106 (CRM 106), a display (not illustrated), and a transceiver(s) (not illustrated). The processor(s) 105 may include any type of processor, such as a central processor unit or a multi-core processor, configured to execute processor-executable instructions (e.g., code) stored by the CRM 106. The CRM 106 may include any suitable memory or storage device, such as volatile memory (e.g., random-access memory (RAM)), non-volatile memory (e.g., Flash memory), optical media, magnetic media (e.g., disk or tape), and so forth.

The CRM 106 may store executable instructions for the power management integrated controller 108 (PMIC 108). Additionally or alternatively, the PMIC 108 or other power management entities of the electronic device 102 may be implemented in a whole or part as hardware logic or an integrated circuit with or separate from the components 104 of the electronic device 102. Generally, the PMIC 108 controls the switching frequency of power control switches (not illustrated in FIG. 1) that selectively enable and/or disable the flow of current in parts of the battery system 110, as described throughout the disclosure.

During charging, electrical power may flow from the power source 120, through a power adapter 130, to the battery system 110, and the battery system 110 supplies energy to (charges) the rechargeable battery cells 111 of the electronic device 102. During discharging, electric power may flow from the battery system 110 (discharges) to power the components 104 of the electronic device 102.

FIG. 2 illustrates a block diagram of an example environment 200, which includes a power adapter 130 coupled to a connector 116 that electrically connects with a battery system 110 of an electronic device 102. The output power ($P_{adapter}$, not illustrated) of the power adapter 130 equals the output voltage ($V_{adapter}$ 202) of the power adapter 130 multiplied by the output current of the power adapter ($I_{adapter}$ 204), as is defined in Formula 1.

$$P_{adapter} = V_{adapter} \cdot I_{adapter} \quad (1)$$

As is demonstrated in Formula 1, to increase the power flow from the power adapter 130 to the battery system 110, there needs to be an increase in $V_{adapter}$ 202 and/or an increase in $I_{adapter}$ 204, where $V_{adapter}$ 202 and $I_{adapter}$ 204 are inputs to the battery system 110. In an implementation where the power adapter 130 supplies $V_{adapter}$ 202, the battery system 110 performs a voltage step-down of the $V_{adapter}$ 202 and outputs a lower voltage ($V_{battery}$ 206). Increasing $V_{adapter}$ 202 translates to a higher voltage-conversion ratio, from $V_{adapter}$ 202 to $V_{battery}$ 206, occurring in the battery system 110.

In a conventional battery charger, however, energy and/or power-transfer efficiency of the battery system is inversely correlated to the voltage-conversion ratio. Ideally, the input power ($P_{adapter}$) to the battery system needs to equal the output power ($P_{battery}$, not illustrated) of the battery system. Low power-transfer efficiency in the battery system often leads to a higher energy loss that, besides wasting energy, translates into heat in the battery system. In terms of power-transfer efficiency, $P_{adapter}$ becomes greater than $P_{battery}$.

As is demonstrated in Formula 1, instead of, or in addition to, increasing $V_{adapter}$ 202, increasing $P_{adapter}$ may be accomplished by increasing $I_{adapter}$ 204. Nevertheless, the power adapter 130 may supply power to the battery system 110 through a power connector, such as a universal serial bus Type-C (USB-C) connector. Thus, one of many limitations of decreasing the charging time by increasing $I_{adapter}$ 204, is the maximum current bus rating of the USB-C connector (e.g., three (3) Amperes (A), five (5) A).

Instead of a wired power adapter, a user may also use a wireless power transfer (WPT) system (e.g., a Qi charger) to transfer power from the power adapter 130 to the battery system 110. Typical WPT systems, however, do not output higher power than wired power adapters and may take longer to charge the rechargeable battery cells 111. Therefore, increasing $I_{adapter}$ 204 is often not feasible regardless of the type of power adapter 130 that the user may utilize to charge the rechargeable battery cells 111 inside the battery system 110.

To increase the operating time of the electronic device 102 using the same storage capacity of the rechargeable battery cells 111, the battery system 110 needs to transfer power to the components 104 of the electronic device 102 by not increasing $V_{battery}$ 206. Note that the system voltage ($V_{system}$, not illustrated) is lower than $V_{battery}$ 206. There is a positive correlation of energy loss to the voltage conversion ratio from the battery system 110 to the voltage-conversion from the battery system 110 to the components 104 of the electronic device 102. The components 104 of the electronic device 102 perform a DC-to-DC power conversion that down-converts $V_{battery}$ 206 to a lower voltage system voltage, $V_{system}$ (not illustrated in FIG. 2). $V_{system}$ powers the components 104 of the electronic device 102 (e.g., processor(s) 105, memory, transceivers, display).

Ideally, to have zero energy loss from the power adapter 130 to the components 104 of the electronic device 102, power flow needs to satisfy the set of equations in Formula 2.

$$\begin{cases} P_{adapter} = V_{adapter} \cdot I_{adapter} \\ P_{battery} = V_{battery} \cdot I_{battery} \\ P_{system} = V_{system} \cdot I_{system} \\ P_{adapter} = P_{battery} = P_{system} \end{cases} \quad (2)$$

Recapping, there are multiple stages of power conversion, such as from the power source 120 (illustrated in FIG. 1) to the power adapter 130, from the power adapter 130 to the battery system 110, and from the battery system 110 to the components 104 of the electronic device 102. When using a conventional battery charger, decreasing the voltage-conversion ratio in one stage translates to increasing the voltage-conversion ratio in another stage. Consequently, a decrease in energy loss in a first stage by decreasing the voltage-conversion ratio in the first stage results in an increase in energy loss in a second stage by increasing the voltage-conversion ratio in the second stage. Therefore, when using a conventional battery charger, increasing the conversion-voltage ratio in any stage introduces energy loss, often in the form of heat, during charging and/or discharging. To this end, in some aspects, the disclosed apparatuses, methods, and techniques for a switched multi-cell battery system decrease energy loss in the battery system without requiring a higher voltage-conversion ratio from the power adapter 130 to the battery system 110, nor from the battery system 110 to the components 104 of the electronic device 102. Furthermore, depending on the number of battery cells 111 used in the battery system 110, the described battery system 110 can increase the voltage-conversion ratio from an output of the power adapter 130 to an output of the battery system 110 and still achieve high power-transfer efficiency, as described in greater detail below.

Operational Principles of a Switched Multi-Cell Battery System

Figure 3A:
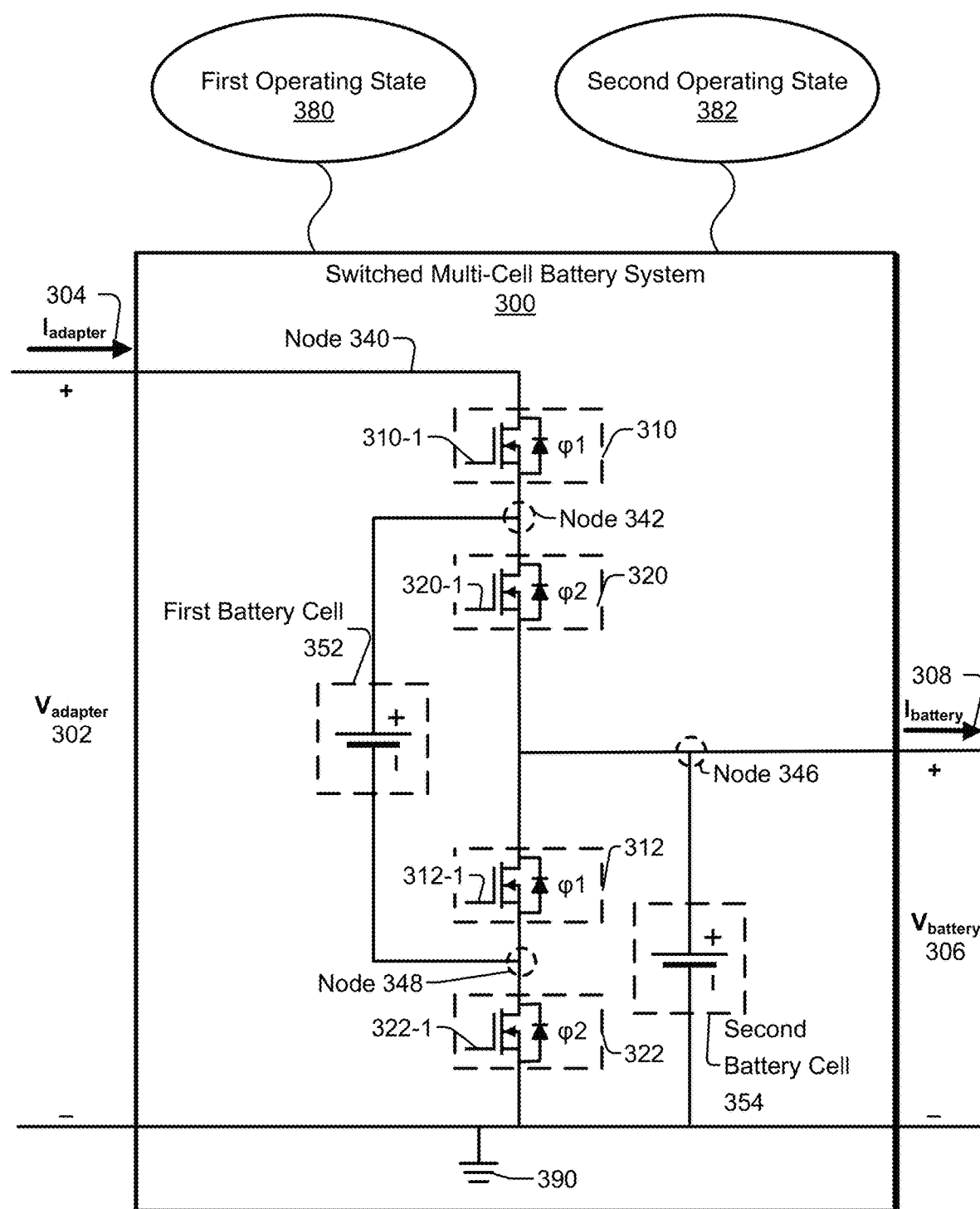
FIG. 3A illustrates a block diagram illustrating an example switched multi-cell battery system that operates in a first operating state and a second operating state.

FIG. 3A illustrates an example of a switched multi-cell battery system 300 (battery system 300) comprising a first battery cell 352 and a second battery cell 354. $I_{adapter}$ 304 and $V_{adapter}$ 302 are current and voltage inputs to the battery system 300, while $I_{battery}$ 308 and $V_{battery}$ 306 are current and voltage outputs of the battery system 300. $V_{adapter}$ 302 is the voltage potential across an input voltage node 340 (node 340) and a ground node 390, while $V_{battery}$ 306 is the voltage potential across an output voltage node 346 (node 346) and the ground node 390.

The battery system 300 of FIG. 3A includes a first plurality of power control switches and a second plurality of power control switches that are used to generate a phase one (φ1) and a phase two (φ2) of a voltage and/or current digital pulse, which can have a duty cycle of (or close) to fifty percent (50%). As described herein, the duty cycle is the fraction of one period for which the pulse adopts φ1. In aspects, the first and second plurality of power control switches are field-effect transistors (FETs). More specifically, to create φ1 and φ2, the battery system 300 of FIG. 3A uses FET 310 and FET 312 in the first plurality of power control switches, and FET 320 and FET 322 in the second plurality of power control switches.

A power management integrated controller (PMIC) (such as the PMIC 108 of FIG. 1) utilizes signal 310-1 to control the switching of FET 310, signal 312-1 to control the switching of FET 312, signal 320-1 to control the switching of FET 320, and signal 322-1 to control the switching of FET 322. Generally, when signals 310-1 and 312-1 are high, signals 320-1 and 322-1 are low. Alternately, when the signals 310-1 and 312-1 are low, the signals 320-1 and 322-1 are high. In some aspects, signals 310-1, 312-1, 320-1, and 322-1 enable the battery system 300 of FIG. 3A to create the φ1 and φ2 of the 50% duty cycle and/or determine whether the battery system 300 of FIG. 3A operates in a first operating state 380 or a second operating state 382.

To generate φ1 and φ2, the battery system 300 of FIG. 3A can utilize various types of active circuit elements, such as the FETs (310, 312, 320, 322). Examples of active circuit elements may include an n-type metal-oxide-semiconductor (-silicon) field-effect transistors (n-MOSFETs), p-type MOSFETs (p-MOSFETs), a combination of n-MOSFETs and p-MOSFETs, or other types of power control switches. In such a case, the PMIC 108 changes the signals 310-1, 320-1, 312-1, and 322-1 (e.g., polarity inversion) to accommodate the type of active circuit elements that are being used to generate φ1 and φ2. Similar modifications may be made to any electrical design described herein.

The frequency of switching between the first operating state 380 and the second operating state 382 in the battery system 300 may be as low as a few hundred Hertz (Hz) and is independent from an operating frequency of the power adapter 130 (illustrated in FIG. 1) and an operating frequency of the components 104 (illustrated in FIG. 1) of the electronic device 102. Compared to a conventional battery charger that often uses a capacitor to store charge temporarily, the switching frequency in the battery system 300 is considerably lower. A lower switching frequency in the battery system 300 of FIG. 3A enables a more-efficient power transfer from the power adapter 130 to the components 104 of the electronic device 102.

A switching period between the first operating state 380 and the second operating state 382 can be varied in aspects of the battery system 300. For example, the switching frequency can be lowered down to a frequency level in which the components 104 of the electronic device 102 starts sensing the switching frequency in the battery system 300. Then, the switching frequency can be increased by a few Hz to avoid that frequency point. By so doing, neither the power adapter 130 nor the components 104 of the electronic device 102 sense the battery system 300 switching between the first operating state 380 and the second operating state 382.

Figure 3B:
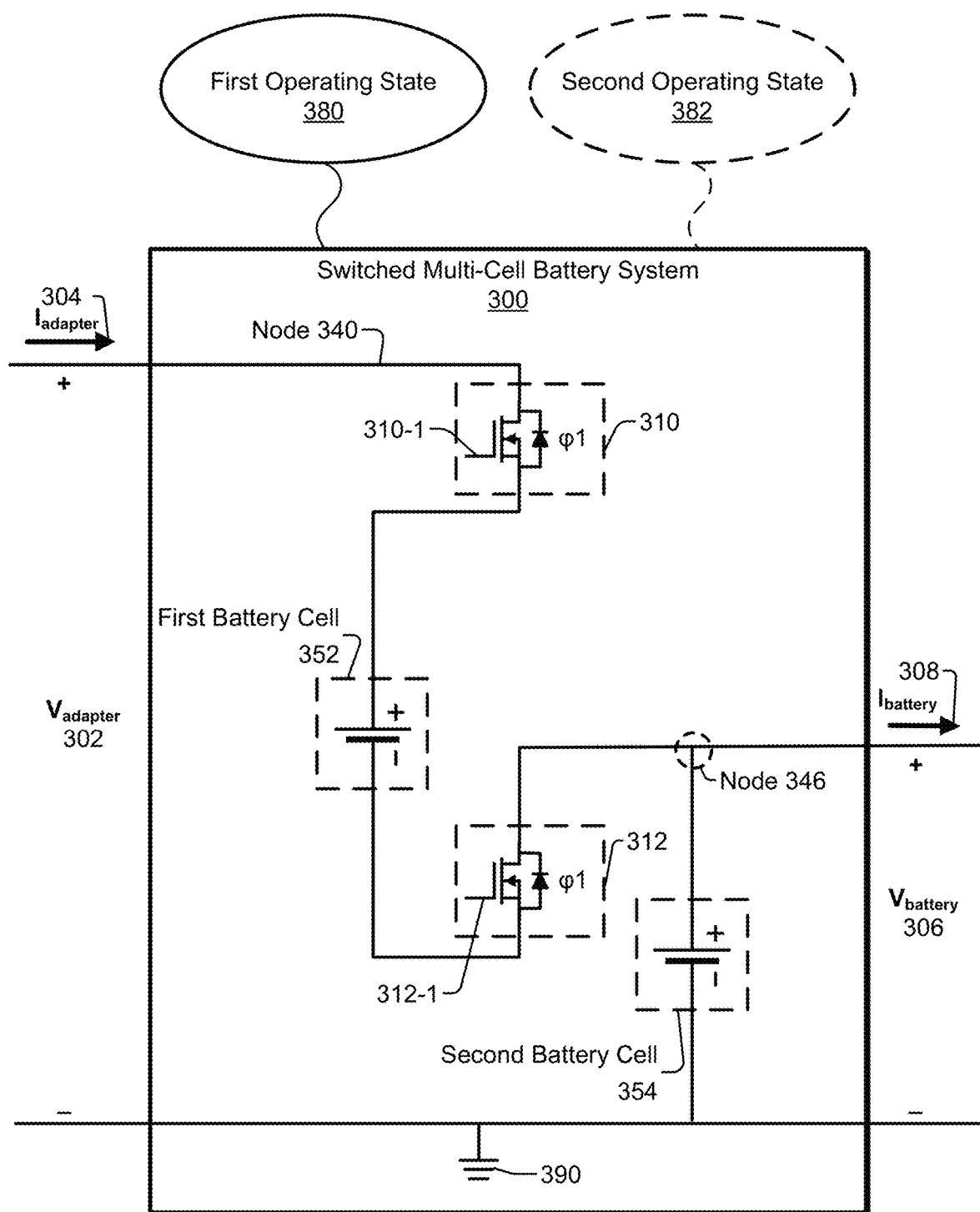
FIG. 3B illustrates a block diagram illustrating the first operating state of the switched multi-cell battery system of FIG. 3A.

FIG. 3B illustrates an example block diagram of the first operating state 380 of the battery system 300 of FIG. 3A, with the battery cells (e.g., 352, 354) connected in series. When the electronic device 102 is coupled to the power adapter 130, the battery system 300 may operate in the first operating state 380 during φ1 that occurs when the first plurality of power control switches (FET 310, FET 312) enable flow of current. The second plurality of power control switches (FET 320, FET 322) disable flow of current, causing electrical circuit openings at certain parts of the block diagram in FIG. 3A, as is illustrated by comparing FIG. 3A to FIG. 3B.

As shown, $V_{adapter}$ 302 is the voltage potential across the input voltage node 340 and the ground node 390 and equals approximately the voltage potential across FET 310, plus the voltage potential across the first battery cell 352, plus the voltage potential across FET 312, plus the voltage potential across the second battery cell 354 (ignoring routing voltage-drop). $V_{battery}$ 306 is the voltage potential across the output voltage node 346 and the ground node 390 and equals approximately the voltage potential across the second battery cell 354 (ignoring routing voltage-drop). Because roughly 50% of the time the battery cells are in parallel, excess charge and/or energy in one battery cell flows to the other battery cell(s). Generally, the first battery cell 352 and the second battery cell 354 measure close to identical voltage potentials across their positive and negative terminals because the battery cells hold approximately the same charge during the first operating state 380 and the second operating state 382. Given that the voltage potential across each battery cell is considerably larger than voltage potentials across other circuit elements in other parts of the battery system 300 of FIG. 3A, in some aspects, $V_{adapter}$ 302 is slightly more than two times larger than $V_{battery}$ 306 in the battery system 300 that contains two battery cells.

The example environment illustrated in FIG. 3B helps demonstrate the example battery system 300 during the first operating state 380, in which the battery system 300 can concurrently transfer power to the battery cells (charging) and to the components 104 (discharging) of the electronic device 102 enabling the user to operate the electronic device 102 while charging the electronic device 102. The input voltage to the components 104, however, equals $V_{battery}$ 306, not $V_{adapter}$ 302. Therefore, the example battery system 300 illustrated in FIGS. 3A and 3B has a voltage-conversion ratio of approximately two (2), which is similar to a conventional battery charger, but the described battery system 300 can transfer power more efficiently.

Figure 3C:
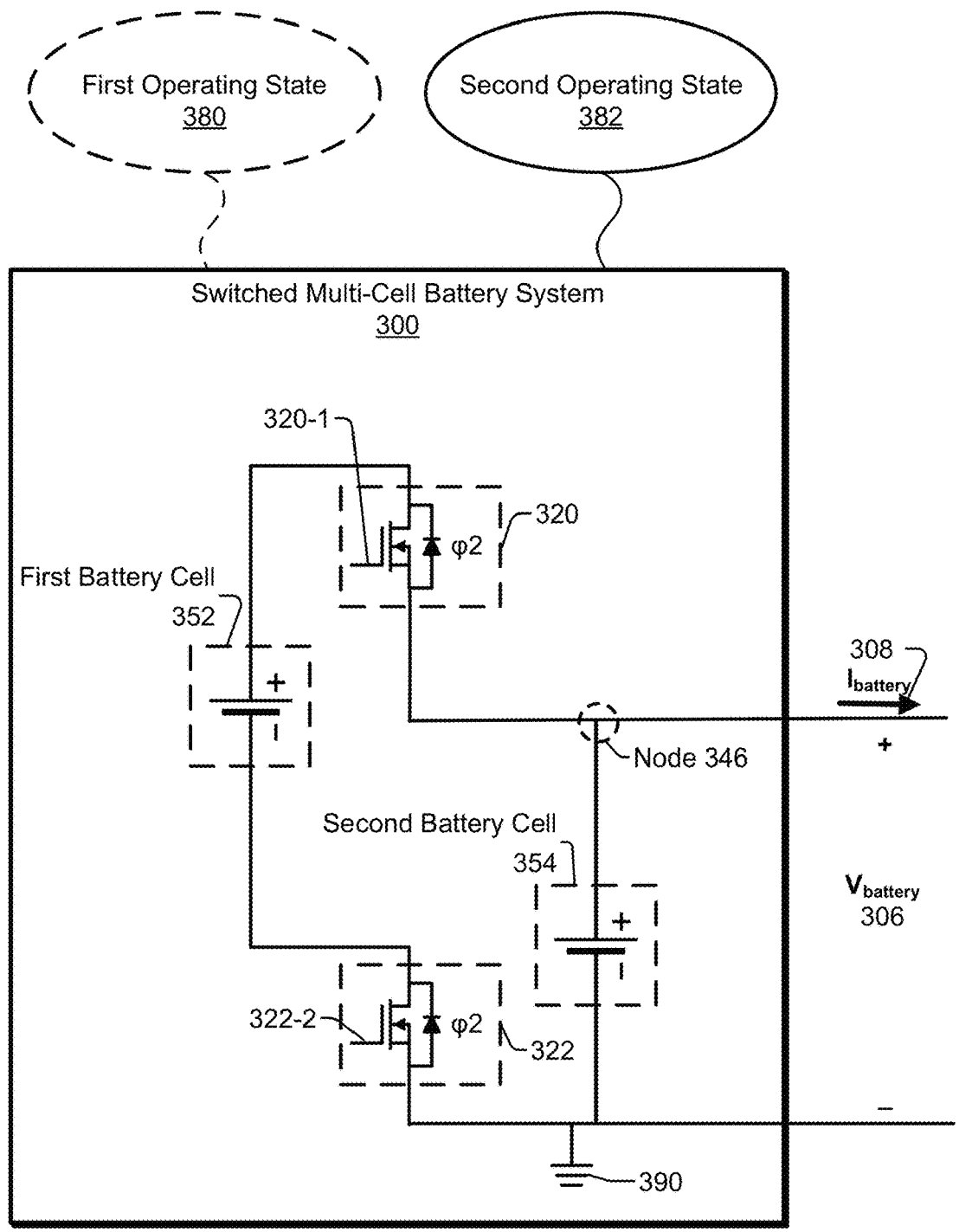
FIG. 3C illustrates a block diagram illustrating the second operating state of the switched multi-cell battery system of FIG. 3A.

FIG. 3C illustrates an example block diagram of the second operating state 382 of the battery system 300 of FIG. 3A, in which the battery cells are connected in parallel. Whether the electronic device 102 is currently coupled to the power adapter 130 or not, the battery system 300 operates in the second operating state 382 during φ2 that occurs when the second plurality of power control switches (FET 320, FET 322) enable flow of current, while the first plurality of power control switches (FET 310, FET 312) disable flow of current, creating electrical circuit openings in certain parts the battery system 300 of FIG. 3A, which may be apparent when comparing FIG. 3A to FIG. 3C.

As is illustrated in FIG. 3C, during φ2 of the battery system 300 of FIG. 3A, the value of $V_{adapter}$ 302 is irrelevant because during the second operating state 382, the power adapter 130 does not transfer electrical power to the battery system 300. Unlike in the first operating state 380 (illustrated in FIG. 3B), during the second operating state 382 (illustrated in FIG. 3C), the first battery cell 352 is connected in parallel with the second battery cell 354. During the second operating state 382, the battery cells are connected in parallel, and excess charge in the first battery cell 352 flows to the second battery cell 354. Generally, the stored energy and/or charge in battery cells are used to transfer electrical power to the components 104 of the electronic device 102. In addition to transferring power more efficiently, using a plurality of battery cells enables the battery system 300 to store more energy and/or charge than a conventional battery charger that contains one battery cell. Thus, compared to a conventional battery charger, the discharging time increases due to less energy loss during power transferring and due to increased energy storage in the battery system 300 of FIGS. 3A, 3B, and 3C.

During the first operating state 380 (illustrated in FIG. 3B) and the second operating state 382 (illustrated in FIG. 3C), $V_{battery}$ 306 may equal the voltage potential across the output voltage node 346 and the ground node 390, equaling approximately half of $V_{adapter}$ 302 (illustrated in FIG. 3A and FIG. 3B). The exact value of $V_{adapter}$ 302 and the exact value of $V_{battery}$ 306 (illustrated in FIG. 3A, FIG. 3B, and FIG. 3C) may differ depending on the state of charge (SoC) of the first battery cell 352 and the second battery cell 354. For example, when the battery cells are fully charged, $V_{battery}$ 306 may be 4.45 V, but when the battery cells are almost depleted, $V_{battery}$ 306 may be closer to 3.5 V, because the value of $V_{battery}$ 306 depends on the voltage potential across each battery cell. The voltage-conversion ratio ($V_{adapter}$ 302 divided by $V_{battery}$ 306), however, remains approximately the same, regardless of how much energy is stored in the battery cells. Here, note that the voltage potential example values explain the concept of input and output voltage fluctuations and are not intended to limit an exact operating voltage of the battery system 300.

The illustrated example of the battery system 300 of FIG. 3A contains two battery cells. In other configurations, however, the battery system 300 can have more than two battery cells, which are connected in series during the first operating state 380 and are connected in parallel during the second operating state 382. Therefore, regardless of how many battery cells are in the battery system 300, $V_{battery}$ 306 equals approximately the voltage potential across the terminals of one battery cell (ignoring routing voltage-drop). The components 104 of the electronic device 102 sense a battery system 300 that outputs $V_{battery}$ 306 approximately equaling the voltage potential across the terminals of one battery cell. Alternately, the power adapter 130 senses a battery system 300 that requires an input $V_{adapter}$ 302 approximately equaling the number of battery cells multiplied by the voltage potential across one battery cell (ignoring routing voltage-drop).

In some aspects, the battery system 300 of FIG. 3A includes two battery cells (the first battery cell 352 and the second battery cell 354), and transfers power by satisfying the set of equations in Formula 3.

$$\begin{cases} P_{adapter} = V_{adapter} \cdot I_{adapter} \\ P_{battery} = V_{battery} \cdot I_{battery} \\ P_{adapter} = P_{battery} \\ V_{adapter} = 2 \cdot V_{battery} \\ I_{battery} = 2 \cdot I_{adapter} \end{cases} \quad (3)$$

In another configuration, the battery system 300 may include three battery cells (not illustrated) and a third plurality of power control switches, such as two additional FETs (not illustrated) transferring power by satisfying the set of equations in Formula 4.

$$\begin{cases} P_{adapter} = V_{adapter} \cdot I_{adapter} \\ P_{battery} = V_{battery} \cdot I_{battery} \\ P_{adapter} = P_{battery} \\ V_{adapter} = 3 \cdot V_{battery} \\ I_{battery} = 3 \cdot I_{adapter} \end{cases} \quad (4)$$

Therefore, if the battery system 300 contains N battery cells (not illustrated), and a fourth, a fifth, . . . , and an N-th plurality of power control switches (not illustrated), the battery system 300 transfers power by satisfying the set of equations in Formula 5. Note that the battery system 300 containing N battery cells may contain 2N power control switches.

$$\begin{cases} P_{adapter} = V_{adapter} \cdot I_{adapter} \\ P_{battery} = V_{battery} \cdot I_{battery} \\ P_{adapter} = P_{battery} \\ V_{adapter} = N \cdot V_{battery} \\ I_{battery} = N \cdot I_{adapter} \end{cases} \quad (5)$$

Use of Discharging Power Control Switches

Figure 4A:
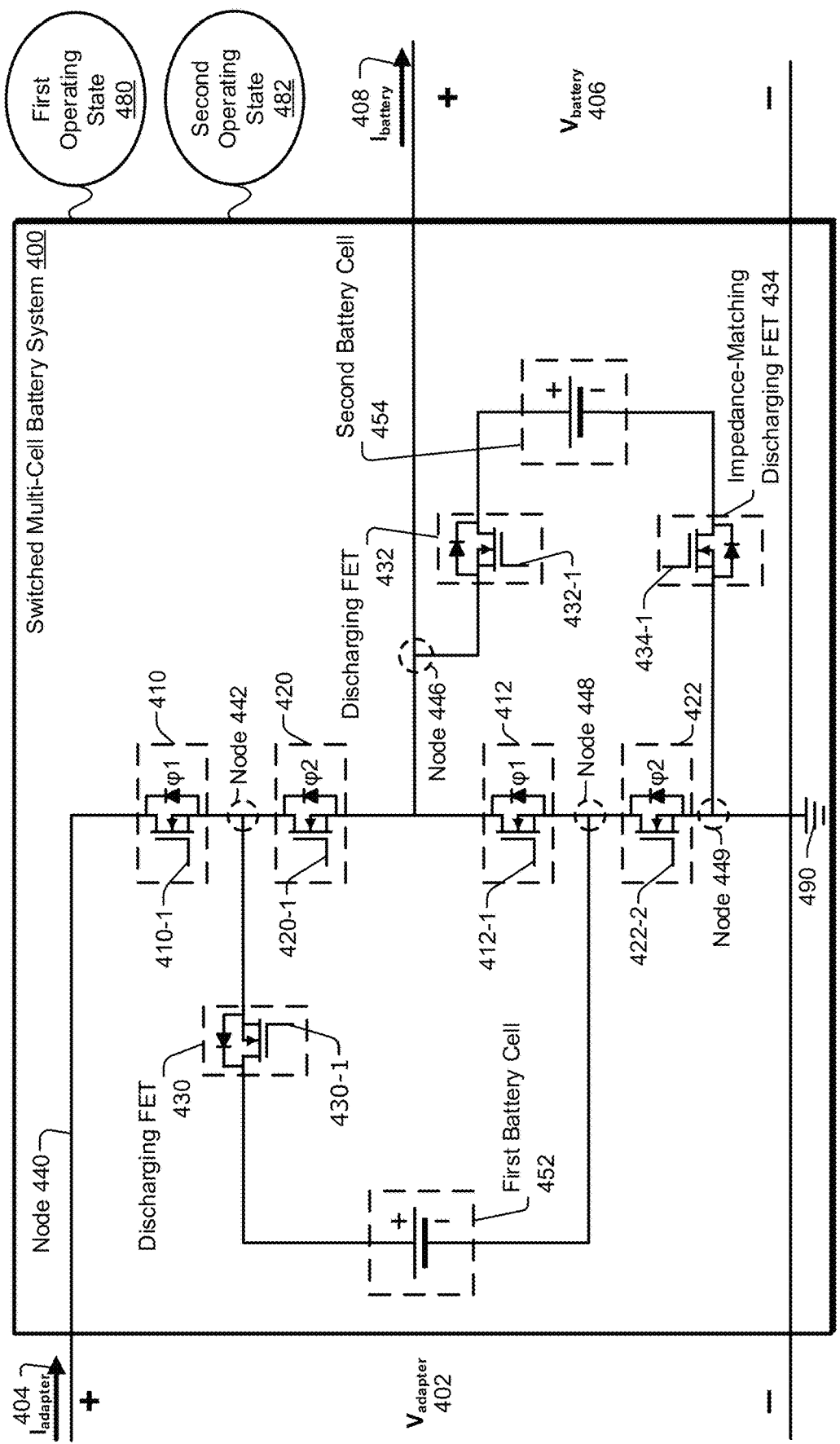
FIG. 4A illustrates a block diagram illustrating a second example switched multi-cell battery system that operates in a first operating state and a second operating state.

FIG. 4A illustrates an example switched multi-cell battery system 400 (battery system 400) that can operate in a first operating state 480 and a second operating state 482. Throughout this disclosure, an operating state may be referenced or labeled with a suffix of −80 for a first operating state or −82 for a second operating state. Generally, the battery system 400 of FIG. 4A utilizes discharging power control switches to protect the battery cells.

Similar to the example in FIG. 3A, the battery system 400 in FIG. 4A includes a first battery cell 452 and a second battery cell 454 that are protected using discharging power control switches (discharging FETs 430, 432, and 434). The discharging FET 430 is coupled between node 442 and node 448, the discharging FET 432 is coupled between an output voltage node 446 (node 446) and node 449, and the discharging FET 434 is also coupled between node 446 and node 449. The discharging FET 434 may help with impedance matching, which will become clearer in subsequent descriptions. Signals 430-1, 432-1, and 434-1, may turn on or activate the illustrated discharging FETs 430, 432, and 434, respectively. Unlike the signals that control the switching of FETs 410, 412, 420, and 422, the signals 430-1, 432-1, and 434-1, may not transition or switch between φ1 and φ2 of the operating stages.

Similar to the battery system 300 of FIG. 3A, the battery system 400 of FIG. 4A uses four FETs (e.g., FET 410, FET 412, FET 420, and FET 422) to generate φ1 and φ2 that enable the battery system 400 to switch between the first operating state 480 and the second operating state 482.

Figure 4B:
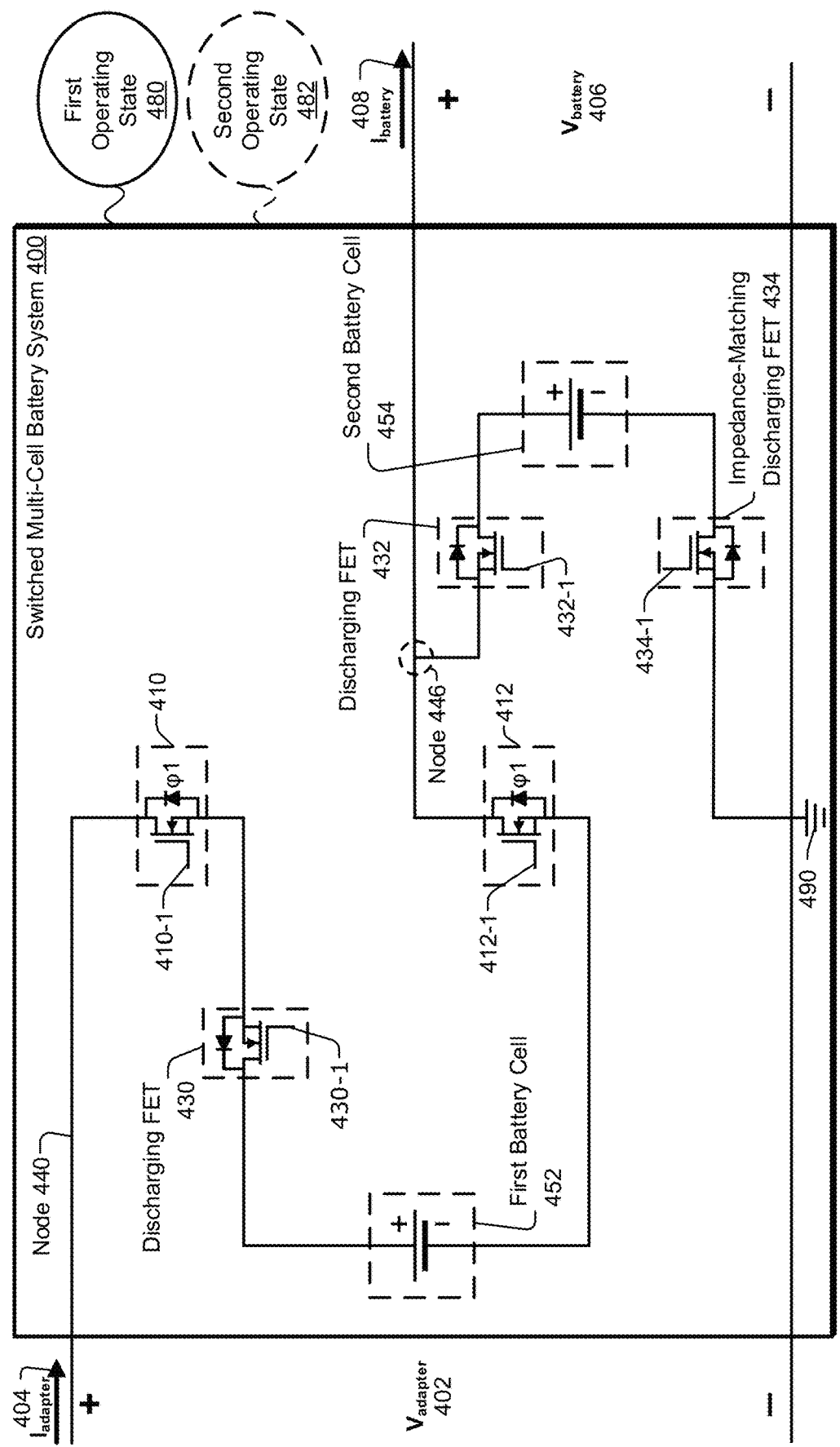
FIG. 4B illustrates a block diagram illustrating the first operating state of the switched multi-cell battery system of FIG. 4A.

FIG. 4B illustrates an example block diagram of the first operating state 480 of the battery system 400 of FIG. 4A, with the battery cells connected in series, and the battery system 400 utilizing discharging power control switches (discharging FET 430, discharging FET 432, discharging FET 434) to protect the battery cells in case of a short circuit. When the electronic device 102 (see FIG. 1) is currently coupled to the power adapter 130 (see FIG. 1), the battery system 400 may operate in the first operating state 480 during φ1 that occurs when a first plurality of power control switches (FET 410, FET 412) enable flow of current, while a second plurality of power control switches (FET 420, FET 422) disable flow of current, causing openings at certain parts of the block diagram in FIG. 4A, which may be apparent by comparing FIG. 4A to FIG. 4B.

In some cases, the discharging FETs 430, 432, and 434 protect the battery cells in the event of a short circuit between an input voltage node 440 (node 440) and a ground node 490 (node 490). Thus, discharging FET 434 offers double protection in case of a short circuit between the output voltage node 446 (node 446) and the ground node 490. Alternately or additionally, discharging FETs 430, 432, and 434, may disable the flow of current in high-current conditions, as is in the case of a short circuit.

Figure 4C:
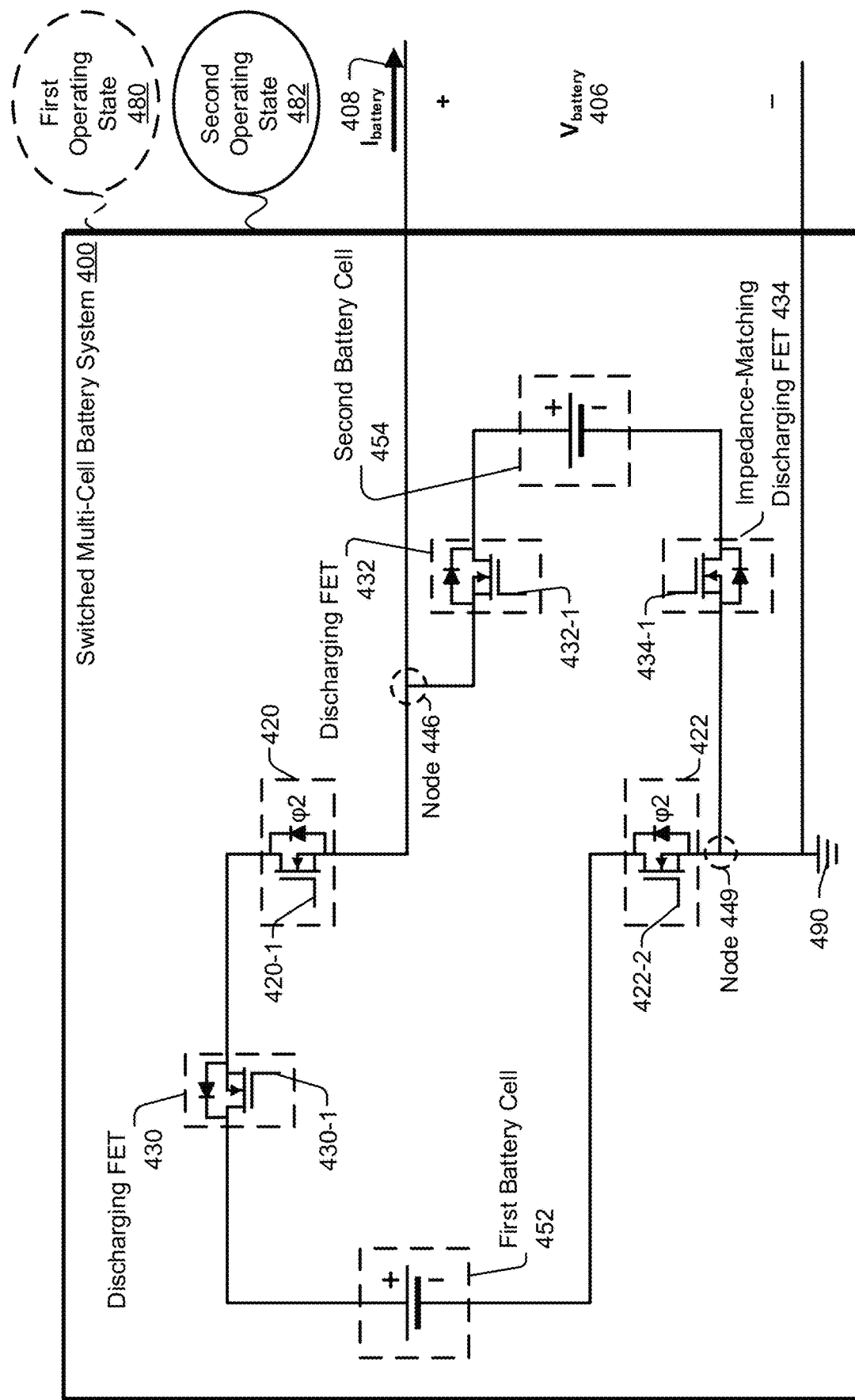
FIG. 4C illustrates a block diagram illustrating the second operating state of the switched multi-cell battery system of FIG. 4A.

FIG. 4C illustrates an example block diagram of the second operating state 482 of the battery system 400 of FIG. 4A, with the first battery cell 452 and the second battery cell 454 connected in parallel. As in FIGS. 4A and 4B, the battery system 400 of FIG. 4C utilizes discharging power control switches (discharging FET 430, discharging FET 432, and discharging FET 434) to protect the battery cells in case of a short circuit. The second operating state 482 in FIG. 4C functions similar to the second operating state 382 described in FIG. 3C. As the first battery cell 452 is connected in parallel to the second battery cell 454, $V_{battery}$ 406 may equal the voltage across the output voltage node 446 (node 446) and the ground node 490. Generally, the voltage across the output voltage node 446 (node 446) to the ground node 390 equals the voltage across FET 420, plus the voltage across the discharging FET 430, plus the voltage across the first battery cell 452, plus the voltage across FET 422 (ignoring routing voltage-drop). Additionally, $V_{battery}$ 406 generally equals the voltage across the output voltage node 446 (node 446) to the ground node 490 that equals the voltage across discharging FET 432, plus the voltage across the second battery cell 454, plus the voltage across the impedance-matching discharging FET 434. The impedance-matching discharging FET 434 may serve a dual purpose; it offers double protection to the second battery cell 114 in the event of a short circuit, and it can provide impedance matching during the second operating state 382. Alternately or additionally, instead of solely utilizing the discharging FET 434 to achieve impedance matching during the second operating state 482, the battery system 400 can be modified by adding a resistive passive circuit element (not illustrated) to achieve impedance matching.

As shown, the examples of the battery system 300 described in FIGS. 3A and 3B, and the battery system 400 described in FIG. 4A and FIG. 4B, the battery cells are connected in series during the first operating state (380 in FIG. 3A and FIG. 3B, 480 in FIG. 4A and FIG. 4B). In this state, the first battery cell (352 in FIG. 3A and FIG. 3B, 452 in FIG. 4A and FIG. 4B) is on the top (closest to the input voltage node), and the second battery cell (354 in FIG. 3A and FIG. 3B, 454 in FIG. 4A and FIG. 4B) is on the bottom (closest to the ground node). The examples of the battery system 300 described in FIG. 3, and the battery system 400 described in FIG. 4, over a lifetime of usage, may unequally use each battery cell due to a different voltage in a respective positive terminal. Also, during the first operating state (380 in FIG. 3A and FIG. 3B, 480 in FIG. 4A and FIG. 4B), the current from the power adapter 130, $I_{adapter}$ 304 and/or $I_{adapter}$ 404, flows through the first battery cell (352 in FIG. 3A and FIG. 3B, 452 in FIG. 4A and FIG. 4B) to the second battery cell (354 in FIG. 3A and FIG. 3B, 454 in FIG. 4A and FIG. 4B).

A Balanced Switched Multi-Cell Battery System

Figure 5A:
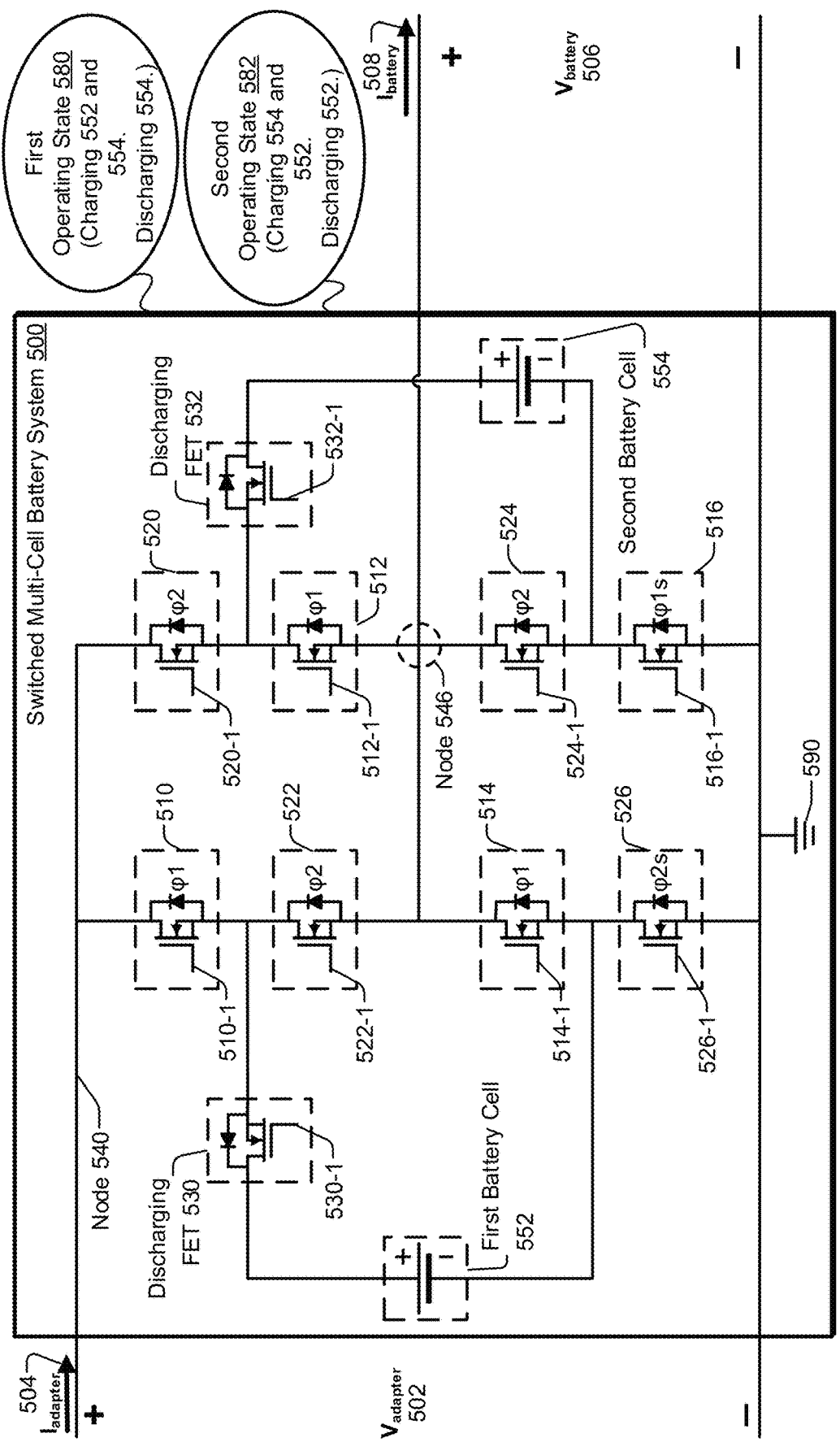
FIG. 5A illustrates a block diagram illustrating a balanced switched multi-cell battery system that operates in a first operating state and a second operating state.

FIG. 5A illustrates a block diagram of an example of a balanced switched multi-cell battery system 500 (battery system 500) including a first battery cell 552 and a second battery cell 554. The battery system 500 of FIG. 5A operates in a first operating state 580 and a second operating state 582. The battery system 500 of FIG. 5A may also utilize discharging power control switches (discharging FET 530, and discharging FET 532) to protect the battery cells. In this example, the battery system 500 of FIG. 5 uses four FETs in a first plurality of power control switches and four FETs in a second plurality of power control switches to generate φ1 and φ2.

The battery system 500 has an input voltage node 540, an output voltage node 546, and a ground node 590, and a first rechargeable battery cell 552 with a positive terminal and a negative terminal and a second rechargeable battery cell 554 with a positive terminal and a negative terminal. The system 500 further includes current control switches comprising at least: a first current control switch 510 having a gate terminal, a first channel terminal coupled to the input voltage node 540, and a second channel terminal coupled (in this example via a discharging FET 530) to the positive terminal of the first rechargeable battery cell 552; a second current control switch 522 having a gate terminal, a first channel terminal coupled to the second channel terminal of the first current control switch 510, and a second channel terminal coupled to the output voltage node 546; and third and fourth current control switches 514, 526 coupled between the second channel terminal of the second current control switch and the ground node 590. In this example the third and fourth current control switches are coupled in series with one another, with the third current control switch 514 having a gate terminal, a first channel terminal coupled to the second channel terminal of the second current control switch 522, and a second channel terminal and the fourth current control switch 526 having a gate terminal, a first channel terminal coupled to the second channel terminal of the third current control switch 514, and a second channel terminal coupled to the ground node 579. The system further includes: a fifth current control switch 520 having a gate terminal, a first channel terminal coupled to the input voltage node 540, and a second channel terminal coupled (in this example via a discharging FET 532) to the positive terminal of the second rechargeable battery cell 554; a sixth current control switch 512 having a gate terminal, a first channel terminal coupled to the second channel terminal of the fifth current control switch 520, and a second channel terminal coupled to the output voltage node 546; and seventh and eighth current control switches 524, 516 coupled between the second channel terminal of the sixth current control switch and the ground node 590. In this example the seventh and eighth current control switches are coupled in series with one another, with the seventh current control switch 524 having a gate terminal, a first channel terminal coupled to the second channel terminal of the sixth current control switch 524, and a second channel terminal, and the eighth current control switch 516 having a gate terminal, a first channel terminal coupled to the second channel terminal of the seventh current control switch 524, and a second channel terminal coupled to the ground node 590. (In modified versions, one or both of the discharging FETs 530, 532 may be omitted or replaced by a passive circuit element as described above.)

Figure 5B:
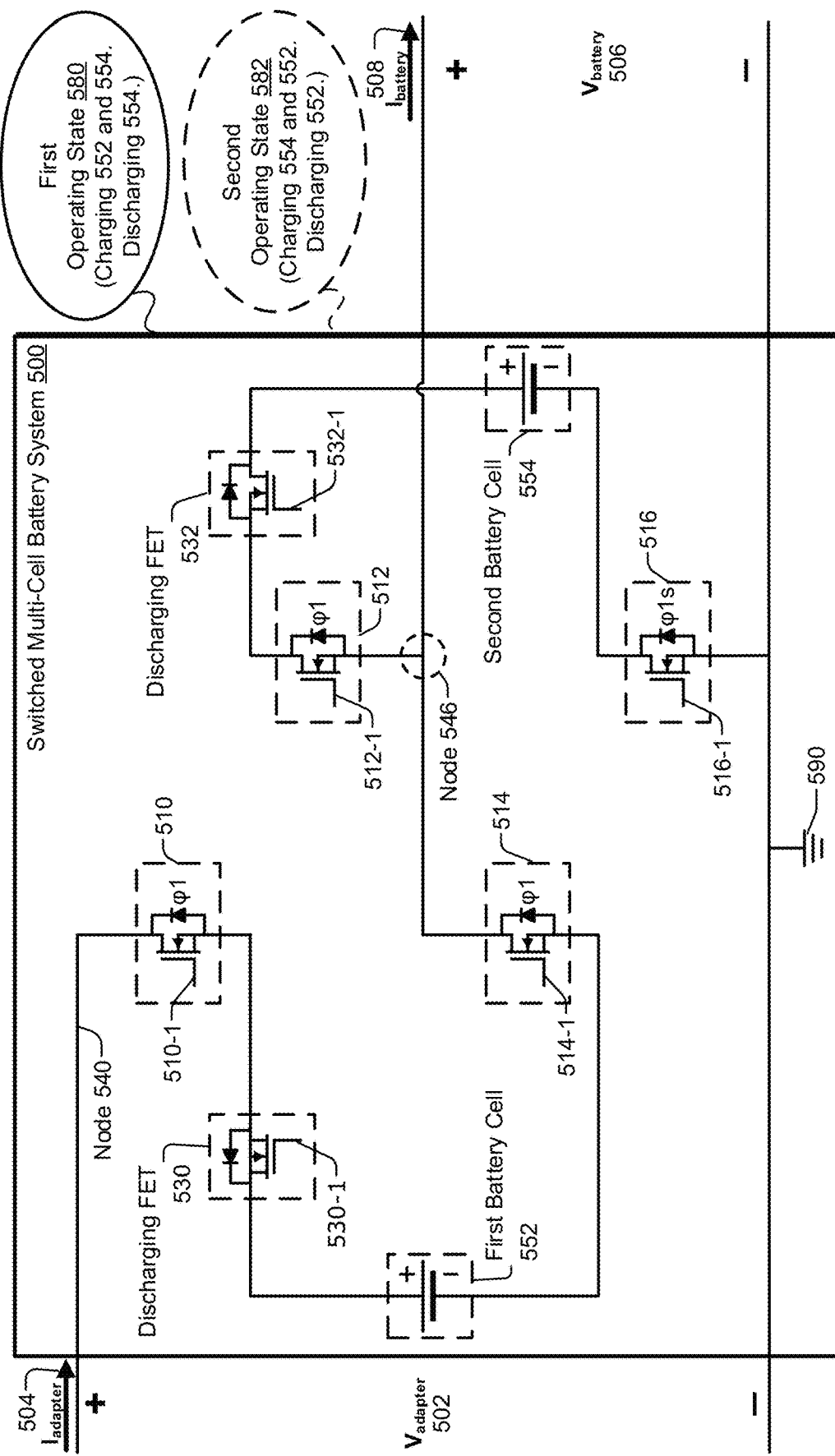
FIG. 5B illustrates a block diagram illustrating the first operating state of the balanced switched multi-cell battery system of FIG. 5A.
Figure 5C:
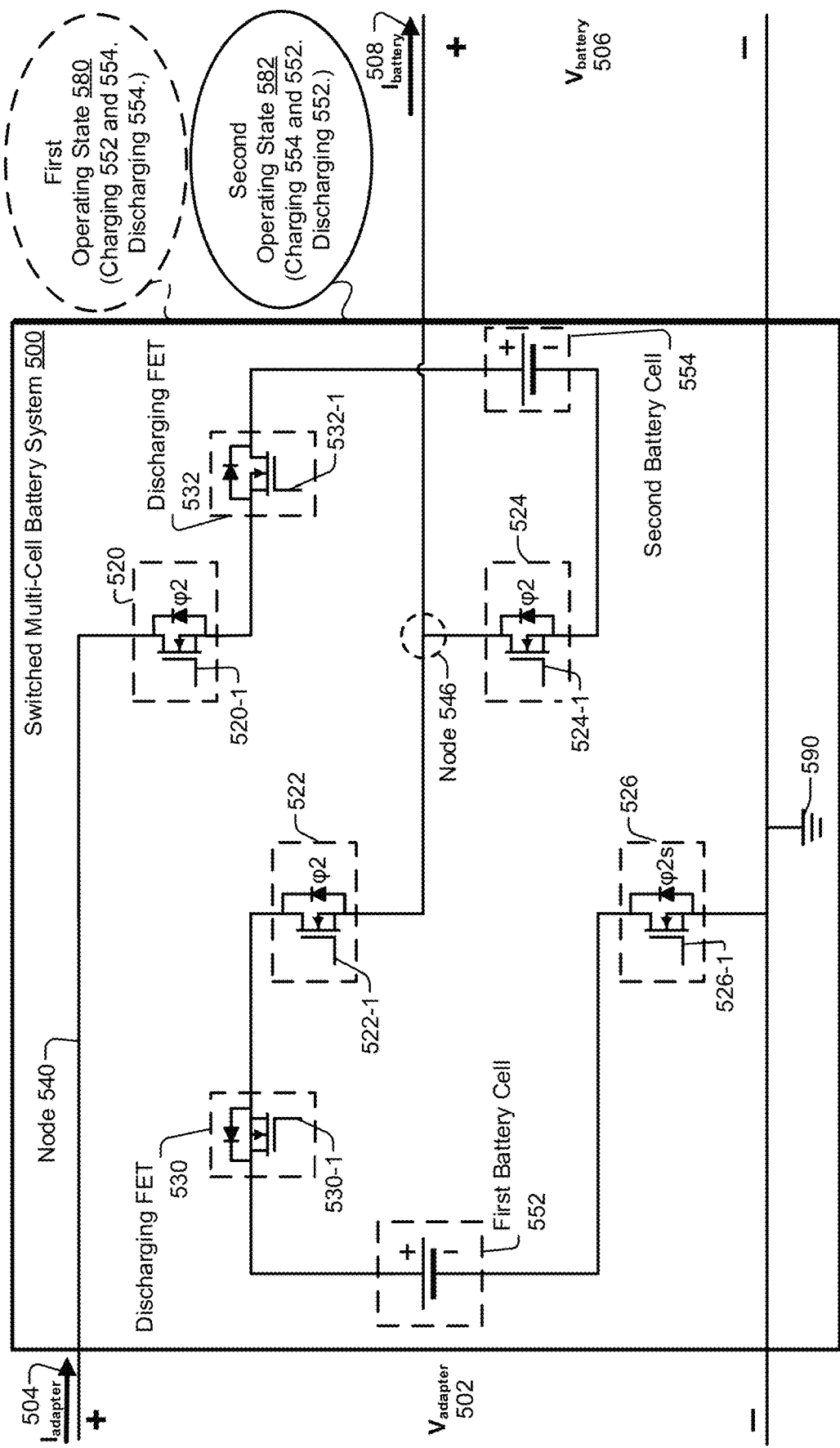
FIG. 5C illustrates a block diagram illustrating the second operating state of the balanced switched multi-cell battery system of FIG. 5A.

In the first plurality of power control switches, the battery system 500 of FIG. 5 uses FETs (e.g., n-MOSFETs) 510, 512, 514, and 516. In the second plurality of power control switches, the battery system 500 of FIG. 5 uses FETs (e.g., n-MOSFETs) 520, 522, 524, and 526. To generate φ1 and φ2, the PMIC 108 (FIG. 1) turns on and off the first plurality of power control switches of FIG. 5A using signals 510-1, 512-1, 514-1, and 516-1, and the PMIC 108 turns on and off the second plurality of power control switches of FIG. 5A using signals 520-1, 522-1, 524-1, and 526-1. For example, when the signals 510-1, 512-1, 514-1, and 516-1 are high, the signals 520-1, 522-1, 524-1, and 526-1 are low and vice versa. Alternately, when the signals 510-1, 512-1, 514-1, and 516-1 are low, the signals 520-1, 522-1, 524-1, and 526-1 are high. Signals 530-1 and 532-1 may turn on or activate the illustrated discharging FETs 530, 532, respectively. Unlike the signals that control the switching of FETs 510, 512, 514, 516, 520, 522, 524 and 526, the signals 530-1 and 532-1 may not transition or switch between φ1 and φ2 of operating stage so that the discharging FETs 530, 532 may be closed in both the first operating state 580 (FIG. 5B) and the second operating state 582 (FIG. 5C).

When the power adapter 130 (FIG. 1) is coupled to the electronic device 102 (FIG. 1), during φ1, the battery system 500 of FIG. 5A operates in the first operating state 580 by charging the first battery cell 552 and the second battery cell 554 and by discharging the second battery cell 554. Alternately, during φ2, the battery system 500 of FIG. 5A operates in the second operating state 582 by charging the first battery cell 552 and the second battery cell 554 and by discharging the first battery cell 552. Thus, the battery system 500 of FIG. 5 alternates which battery cell transfers electrical power (discharges) to the components 104 of the electronic device 102 depending on whether the battery system 500 of FIG. 5A is operating in the first operating state 580 or in the second operating state 582. Thus, by appropriate choice of 1 and (2 it is possible to control the proportion of time for which the first battery cell 552 transfers electrical power to the components 104 of the electronic device 102 and the proportion of time for which the second battery cell 554 transfers electrical power to the components 104 of the electronic device 102. As one non-limiting example, if ω1 and φ2 are chosen to provide a 50% duty ratio, each of the first battery cell 552 and the second battery cell 554 transfers electrical power to the components 104 of the electronic device 102 for 50% of the time.

In some aspects, discharging FET 530 and discharging FET 532 provide short-circuit protection in the event that the first and second plurality of power control switches that generate φ1 and φ2 fail at the same time. For example, discharging FET 530 and/or discharging FET 532 open the circuit during a high-current condition, protecting the battery system 500 of FIG. 5A, the first battery cell 552, the second battery cell 554, and the electronic device 102.

FIG. 5B illustrates an example block diagram of the first operating state 580 of the battery system 500 of FIG. 5A. During the first operating state 580, signals 510-1, 512-1, 514-1, and 516-1 turn on the first plurality of power control switches (FETs 510, 512, 514, and 516). Alternately, during the first operating state 580, signals 520-1, 522-1, 524-1, and 526-1 turn off the second plurality of power control switches (FETs 520, 522, 524, and 526), creating circuit openings in certain parts of the battery system 500, which may be apparent by comparing FIG. 5A to FIG. 5B.

Generally, when the power adapter 130 is coupled to the electronic device 102, during the first operating state 580, the power adapter 130 transfers electrical power to the first battery cell 552, the second battery cell 554, and the components 104 of the electronic device 102, concurrently. $I_{adapter}$ 504 enters an output voltage node 546 (node 546), through the first battery cell 552, and exits the output voltage node 546 (node 546) satisfying Kirchhoffs Current Law (KCL), as is illustrated in Formula 6:

$$I_{adapter} = I_{battery} + I_{554} \quad (6)$$

where $I_{554}$ (not illustrated) stands for the current exiting the output voltage node 546 (node 546) and going into the second battery cell 554.

In this example, $V_{adapter}$ 502 is the voltage potential across an input voltage node (node 540) and a ground node 590 and equals approximately the voltage potential across FET 510, plus the voltage potential across the discharging FET 530, plus the voltage potential across the first battery cell 552, plus the voltage potential across FET 514, plus the voltage potential across FET 512, plus the voltage potential across the discharging FET 532, plus the voltage potential across the second battery cell 554, plus the voltage potential across FET 516 (ignoring routing voltage-drop).

When the power adapter 130 is not coupled to the electronic device 102, there is no current flow from the power adapter 130 to the battery system 500 of FIG. 5 ($I_{adapter}$ 404 is zero). Thus, when the power adapter 130 is not coupled to the electronic device 102, during the first operating state 580, the battery system 500 of FIG. 5 transfers energy stored in the second battery cell 554 into the components 104 of the electronic device 102 that are coupled to the output voltage node. Alternatively, the power management integrated controller (PMIC 108) can be configured to discharge the first (552) and the second (554) battery cells is parallel by turning on FETs 522, 526, 512, and 516 (not illustrated).

Regardless of whether the power adapter 130 is coupled or not coupled to the electronic device 102, during the first operating state 580, $V_{battery}$ 506 is the voltage potential across the output voltage node 546 (node 546) and the ground node 590 and equals approximately the voltage potential across FET 512, plus the voltage potential across the discharging FET 532, plus the voltage potential across the second battery cell 554, plus the voltage potential across FET 516 (ignoring routing voltage-drop). Therefore, whether the power adapter 130 is coupled or not coupled to the electronic device 102, $V_{battery}$ 506 changes only by a change in the voltage potential across the second battery cell 554. Recall that one reason for the change in the voltage potential across a battery cell may be due to the amount of charge stored in the battery cell (e.g., fully charged, fully depleted, partially charged).

FIG. 5C illustrates an example block diagram of the second operating state 582 of the battery system 500 of FIG. 5A. During the second operating state 582, signals 520-1, 522-1, 524-1, and 526-1 turn on the second plurality of power control switches (FETs 520, 522, 524, and 526). Alternately, still during the second operating state 582, signals 510-1, 512-1, 514-1, and 516-1 turn off the first plurality of power control switches (FETs 510, 512, 514, and 516), creating circuit openings in certain parts of the battery system 500, as is illustrated by comparing FIG. 5A to FIG. 5C.

When the power adapter 130 is coupled to the electronic device 102, during the second operating state 582, the power adapter 130 transfers electrical power to the first battery cell 552, the second battery cell 554, and the components 104 of the electronic device 102, concurrently. $I_{adapter}$ 504 enters the output voltage node 546 (node 546), through the second battery cell 554, and exits the output voltage node 546 (node 546) satisfying KCL, as is illustrated in Formula 7:

$$I_{adapter} = I_{battery} + I_{552} \quad (7)$$

where $I_{552}$ (not illustrated) stands for the current exiting the output voltage node 546 (node 546) and going into the first battery cell 552.

When the power adapter 130 is coupled to the electronic device 102, recall that, during the first operating state 580 (FIG. 5B), $I_{adapter}$ 504 goes into the first battery cell 552. In contrast, during the second operating state 582 (FIG. 5C), $I_{adapter}$ 504 goes into the second battery cell 554.

Generally, $V_{adapter}$ 502 is the voltage potential across the input voltage node 540 (node 540) to the ground node 590 and equals approximately the voltage potential across FET 520, plus the voltage potential across the discharging FET 532, plus the voltage potential across second battery cell 554, plus the voltage potential across the discharging FET 524, plus the voltage potential across FET 522, plus the voltage potential across the discharging FET 530, plus the voltage potential across the first battery cell 552, plus the voltage potential across FET 526 (ignoring routing voltage-drop).

$V_{battery}$ 506 is the voltage potential across the output voltage node 546 (node 546) and the ground node 590 and equals approximately the voltage potential across FET 522, plus the voltage potential across the discharging FET 530, plus the voltage potential across the first battery cell 552, plus the voltage potential across FET 526 (ignoring routing voltage-drop).

Therefore, the battery system 500 of FIGS. 5A, 5B, and 5C, over time exposes each battery cell to the same voltages and the same currents. In addition, the battery system 500 of FIGS. 5A, 5B, and 5C automatically balances the charge between the first battery cell 552 and the second battery cell 554. Also, over time, after multiple battery charging and depleting cycles, the battery system 500 in FIGS. 5A, 5B, and 5C degrades the battery cells equally.

Although not illustrated, the battery system 500 of FIGS. 5A, 5B, and 5C may include more than two battery cells. For example, the battery system 500 may include a third battery cell (not illustrated) and a third plurality of power control switches (not illustrated, e.g., implemented with a same topology as shown with respect to cell 1 or cell 2). The third plurality of power control switches allows the battery system 500 to operate in a third operating state (not illustrated) and, overtime, automatically balances the charge between the first battery cell 552 and the second battery cell 554 and the third battery cell (not illustrated). Note that the battery system 500 containing three battery cells may contain twelve power control switches. Similarly, a battery system 500 containing N battery cells may contain 4N power control switches.

Figure 6A:
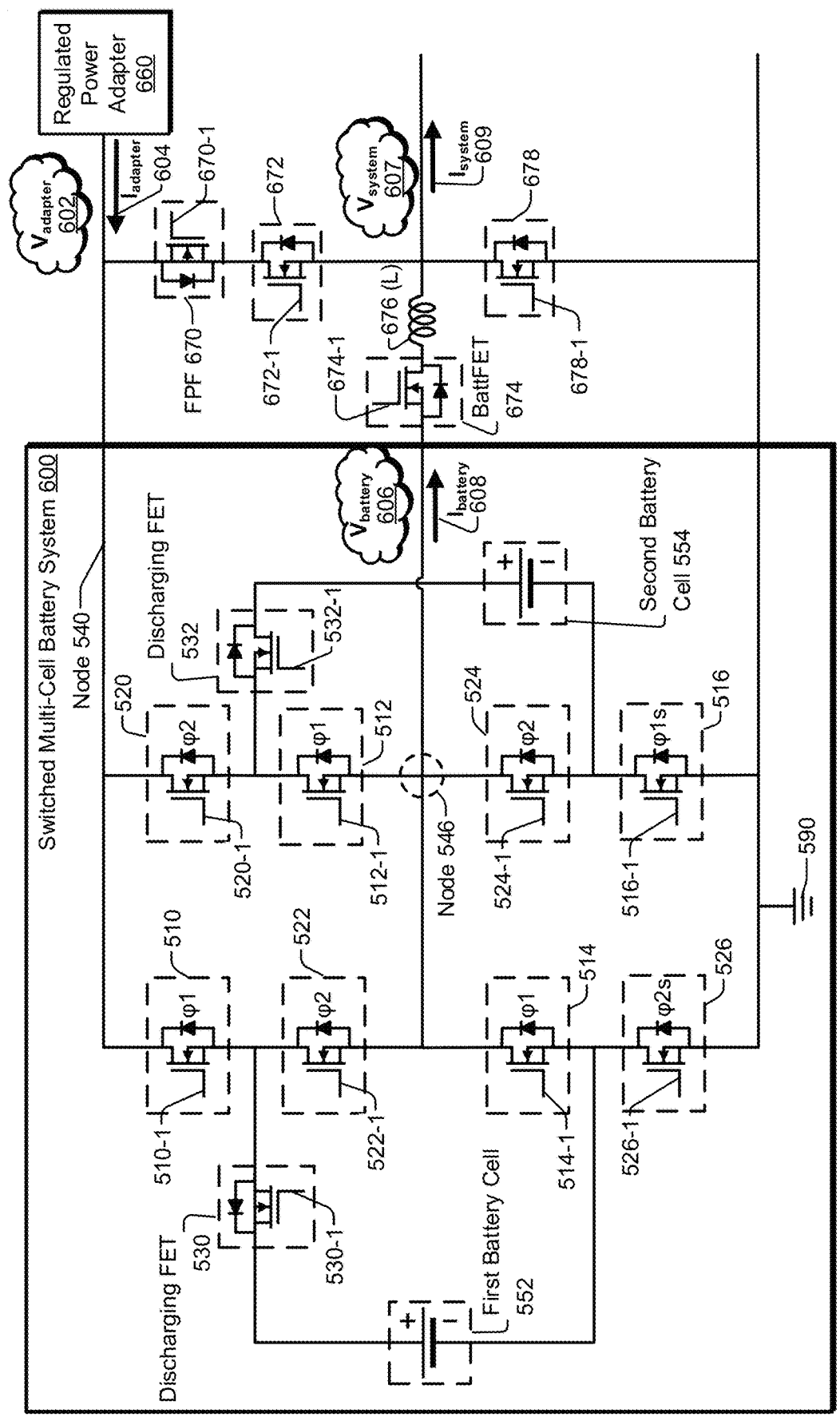
FIG. 6A illustrates a block diagram illustrating a regulated power adapter coupled to the balanced switched multi-cell battery system of FIG. 5A.

FIG. 6A illustrates a block diagram of an example regulated power adapter 660 coupled to a balanced switched multi-cell battery system 600 (battery system 600). The balanced battery system 600 is similar to the balanced battery system 500 of FIG. 5A, and detailed description of the balanced battery system will not be repeated here. The voltage potential of the input voltage node 540 is $V_{adapter}$ 602. The voltage potential of the output voltage node 546 is $V_{battery}$ 606. The voltage potential inside the components 104 of the electronic device 102 is $V_{system}$ 607. Between a battery FET 674 (BattFET 674) and an inductance 676 (L) a power conversion occurs from $V_{battery}$ 608 to $V_{system}$ 607 in the components 104. Also, between the components 104 and the regulated power adapter 660 are coupled a front-porch FET 670 (FPF 670), a power control switch 672 (FET 672), and a power control switch 678 (FET 678), as is illustrated in FIG. 6A.

In some aspects, the regulated power adapter 660 may supply a high enough voltage to charge the battery cells when they are connected in series. The battery system 600 in FIG. 6A works as intended (similar to FIG. 5A) when the user utilizes the regulated power adapter 660 to charge the electronic device 102. Therefore, the battery system 600 works as intended with numerous power adapters that can supply the proper voltage level. Although not illustrated, the battery system 600 in FIG. 6A functions as intended in the first operating state 580 (see FIG. 5B) and the second operating state 582 (see FIG. 5C).

Figure 6B:
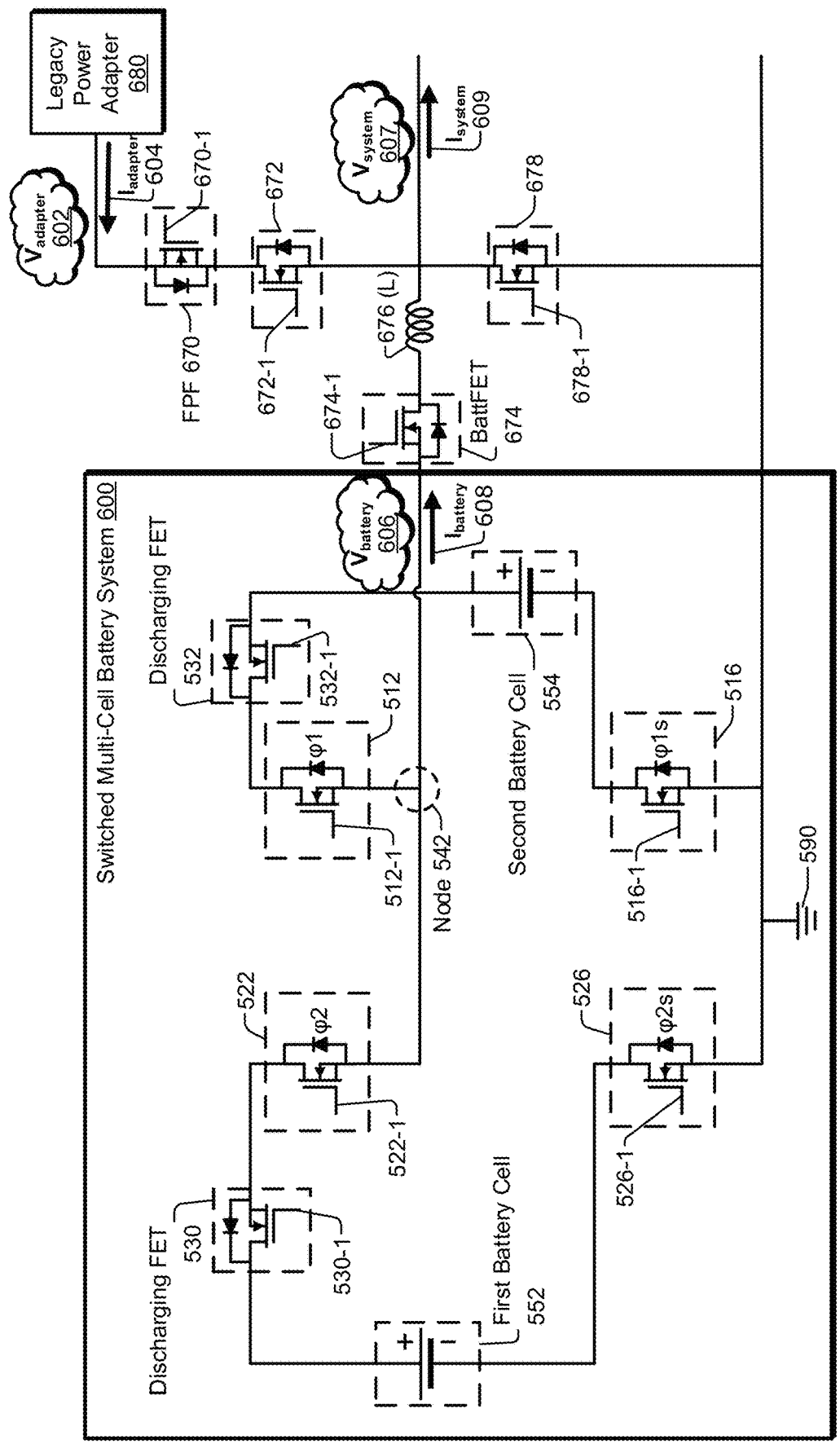
FIG. 6B illustrates a block diagram illustrating a legacy power adapter coupled to the balanced switched multi-cell battery system of FIG. 5A.

FIG. 6B illustrates a block diagram of an example legacy power adapter 680 coupled to the battery system 600, similar to the battery system 500 of FIG. 5A. The voltage potential of the input voltage node 540 is $V_{adapter}$ 602. The voltage potential of the output voltage node 546 is $V_{battery}$ 606. The voltage potential inside the components 104 of the electronic device 102 is $V_{system}$ 607. Between a battery FET 674 (BattFET 674) and an inductance 676 (L) occurs a power conversion from $V_{battery}$ 608 to $V_{system}$ 607 in the components 104. Also, between the components 104 and the regulated power adapter 660 are coupled a front-porch FET 670 (FPF 670), a power control switch 672 (FET 672), and a power control switch 678 (FET 678), as is illustrated in FIG. 6A.

The legacy power adapter 680, however, may only supply 5 V, and the voltage potential across the terminals of each battery cell (first battery cell 552 and second battery cell 554) may be 4.5 V. In this case, the legacy power adapter 680 cannot supply a high enough voltage potential to charge the battery cells if they are connected in series. The user, however, can still use the legacy power adapter 680 to charge the battery system 600 of the electronic device 102. The PMIC 108 (FIG. 1) configures the battery system 600 by coupling the battery cells in parallel during φ1 and φ2. FET 526 and FET 516 enable the flow of current during φ1 and φ2.

Figure 7:
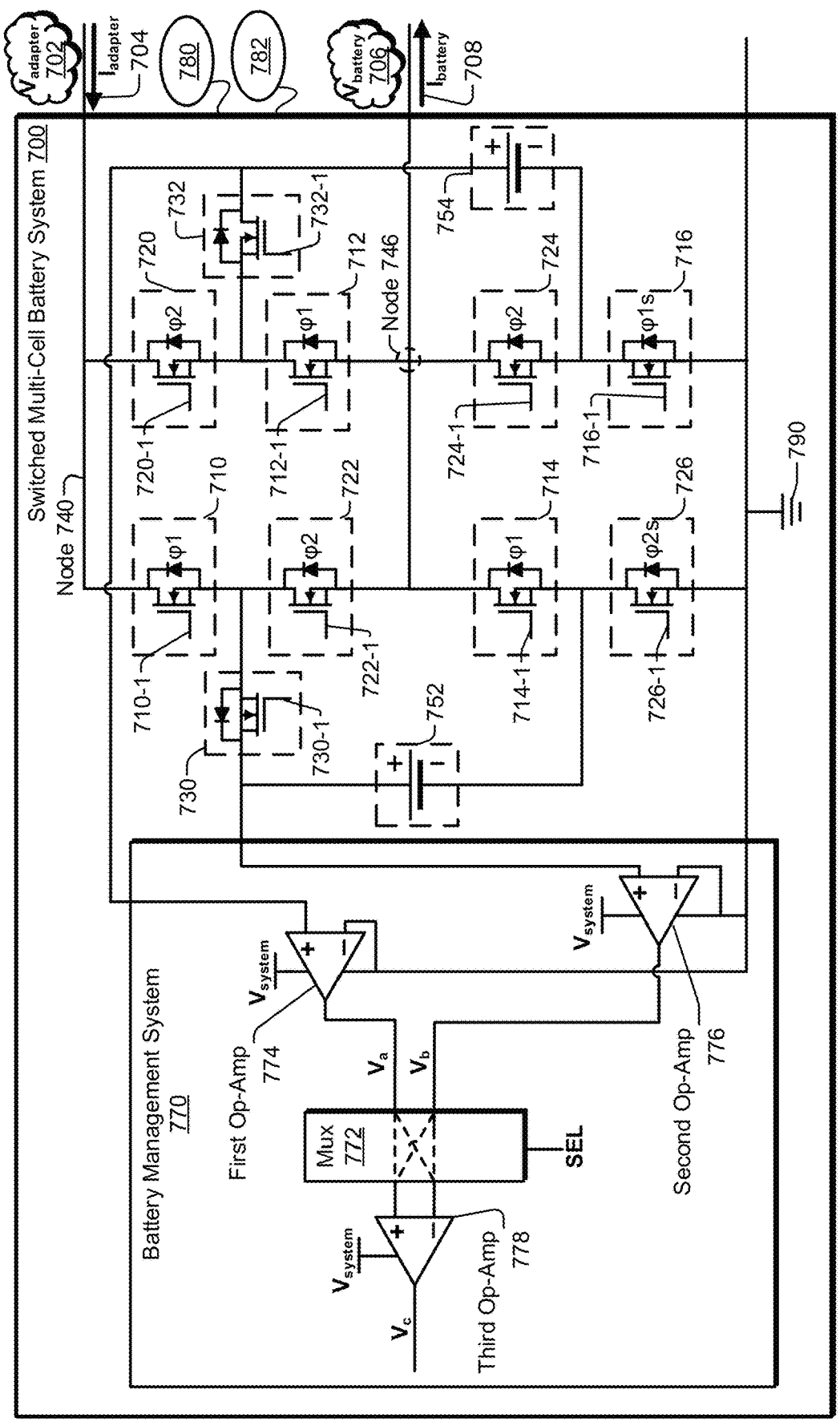
FIG. 7 illustrates a block diagram illustrating a third example of a balanced switched multi-cell battery system, including a battery management system.

FIG. 7 illustrates a block diagram of an example of a balanced switched multi-cell battery system 700 (battery system 700) including a battery management system 770 (BMS 770). The battery system 700 of FIG. 7 operates similarly to the battery system 500 illustrated in FIGS. 5A, 5B, and 5C, operating in a first operating state 780 and a second operating state 782. In addition to the descriptions in FIGS. 5A, 5B, and 5C, by using the BMS 770, the battery system 700 of FIG. 7 can monitor the energy and/or the charge stored in each battery cell and can mitigate the effects of a floating ground node 790 (ground node 790).

Generally, in electrical circuits a ground can be relative or different between various components or power rails. In some aspects, voltages in an isolated electrical component may reference a local ground. For example, the main apparatuses in FIG. 2, such as the power adapter 130, the battery system 110, and the components 104 of the electronic device 102, have their own local grounds. In the battery system 700 of FIG. 7, the ground node 790 can be considered a floating ground as the battery system 700 switches between φ1 and φ2, or between the first operating state 780 and the second operating state 782. Thus, besides monitoring and reporting the energy and/or the charge stored in each battery cell, the BMS 770, can also mitigate the effects of the floating ground node 790.

In various aspects, the BMS 770 utilizes operational amplifiers (op-amps), including a first op-amp 774 and a second op-amp 776, to generate two voltage potentials, $V_a$ and $V_b$, that reference the same ground node 790, as is illustrated in FIG. 7. An operational amplifier is a voltage amplifier with a differential input that produces an output potential. $V_a$ and $V_b$ are inputs to a multiplexer 772 (mux 772) that, depending on the value of a select (SEL) signal to the mux 772, supplies two voltage potentials to a third op-amp 778 that outputs a voltage potential VW.

The SEL signal to the mux 772 is zero (0) during φ1, or during the first operating state 780, satisfying the set of conditions and/or equations in Formula 8:

$$\begin{cases} SEL = 0 \\ V_c = V_a - V_b \\ V_a = V_{752} + V_{754} \\ V_b = V_{754} \\ V_c = V_{752} \end{cases} \quad (8)$$

where $V_{752}$ stands for the voltage potential across the first battery cell 752, $V_{754}$ stands for the voltage potential across the second battery cell 754, and $V_c$ stands for the output of the BMS 770.

The SEL signal to the mux 772 is one (1) during φ2, or during the second operating state 782, satisfying the set of conditions and/or equations in Formula 9:

$$\begin{cases} SEL = 1 \\ V_c = V_b - V_a \\ V_b = V_{752} + V_{754} \\ V_a = V_{752} \\ V_c = V_{754} \end{cases} \quad (9)$$

Generally, the BMS 770 may sample the voltages across the first battery cell 752 and across the second battery cell 754 and sends the $V_{752}$ and $V_{754}$ values of to the components 104 of the electronic device 102 for fuel-gauging purposes. These values of $V_{752}$ and $V_{754}$ are also useful to notify the user on the charging status of the battery system 110 (e.g., 30% battery charge, low battery, and so forth). When one battery cell has more charge compared to the other battery cell(s), then the battery cell having more charge is used longer during discharging until it measures the same voltage potential as the other battery cell(s). When the battery cells have approximately the same amount of stored charge then, the battery system 700 of FIG. 7 alternates the charging and/or discharging of the battery cells.

Example Methods

An example method 800 is described with reference to FIG. 8 in accordance with one or more aspects of managing a switched multi-cell battery system. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-a-Chip systems (SoCs), Complex Programmable Logic Devices (CPLDs), and the like.

Figure 8:
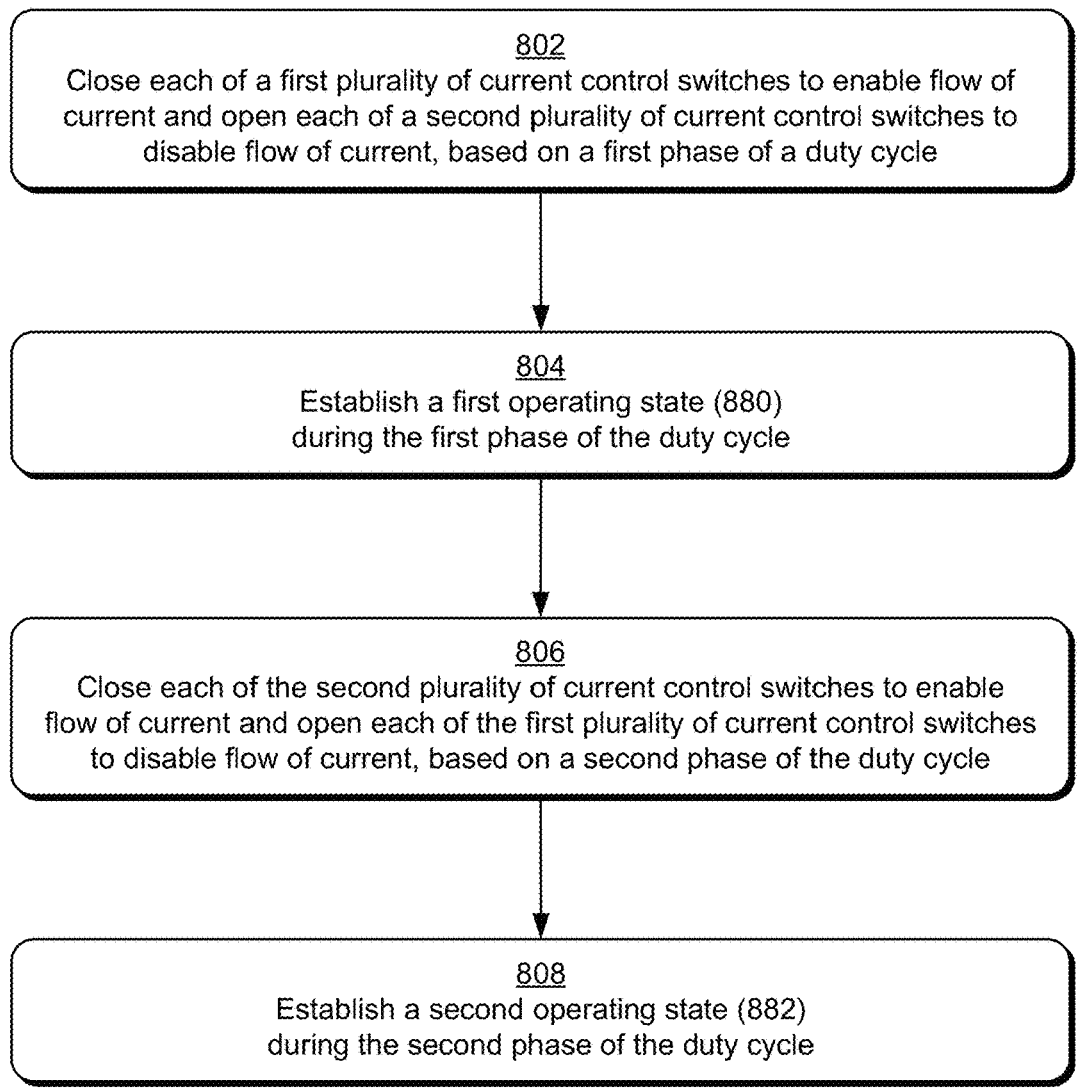
FIG. 8 illustrates an example method for managing a switched multi-cell battery system.

FIG. 8 depicts example method 800 for managing a switched multi-cell battery system (e.g., 500, 700). Method 800 illustrates sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods. The techniques described in this specification are not limited to performance by one entity or multiple entities operating on one device.

At 802, during φ1, each of the first plurality of power control switches (e.g., 510, 710, 512, 712, 514, 714, 516, 716) are closed to enable flow of current and each of the second plurality of power control switches (e.g., 520, 720, 522, 722, 524, 724, 526, 726) are opened to disable flow of current.

At 804, during φ1, a first operating state (e.g., 580, 780, 880) is established, and electrical power from a power adapter 130 charges a first battery cell (e.g., 552, 752) and a second battery cell (e.g., 554, 754), and charge stored in the second battery cell (e.g., 554, 754) flows to components 104 of an electronic device 102.

At 806, during φ2, each of the second plurality of power control switches (e.g., 520, 720, 522, 722, 524, 724, 526, 726) is closed to enable flow of current and each of the first plurality of power control switches is opened (e.g., 510, 710, 512, 712, 514, 714, 516, 716) to disable flow of current.

At 808, during φ2, a second operating state is established (e.g., 582, 782, 882), and electrical power from a power adapter 130 charges the second battery cell (e.g., 554, 754) and the first battery cell (e.g., 552, 752), and charge stored in the first battery cell (e.g., 552, 752) flows to the components 104 of the electronic device 102.

Figure 9:
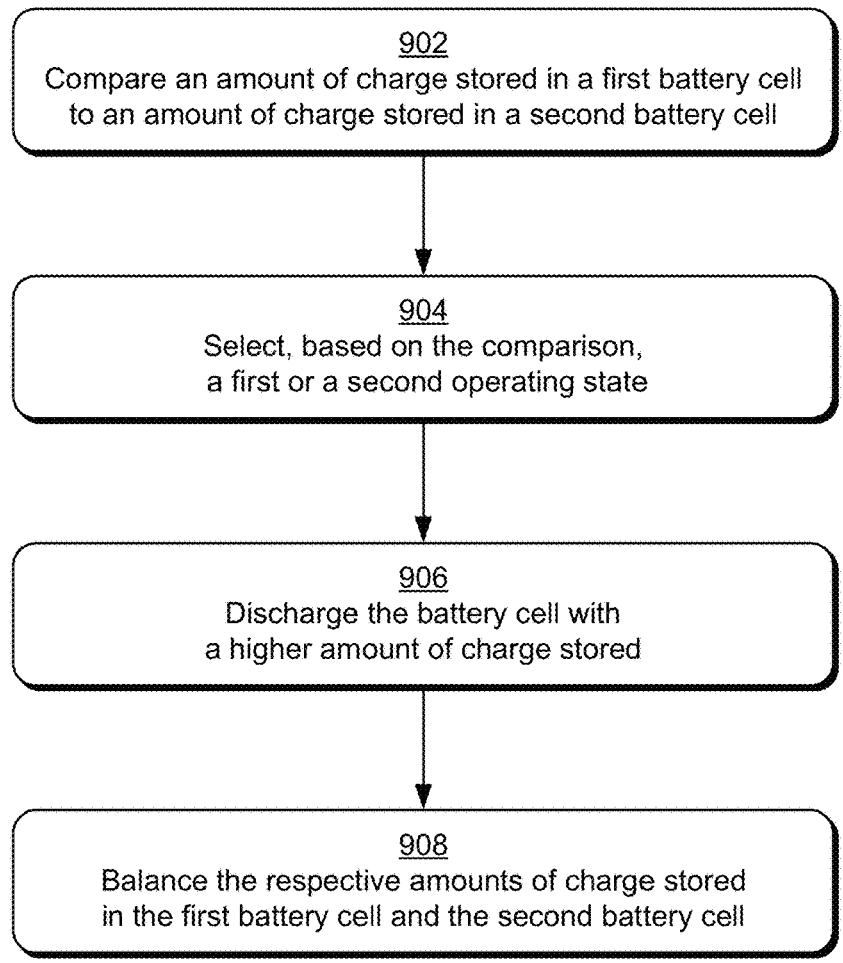
FIG. 9 illustrates an example method for utilizing the battery management system of the balanced switched multi-cell battery system.

FIG. 9 depicts example method 900 for utilizing the battery management system 770 (BMS 770) of the balanced switched multi-cell battery system 700 (battery system 700). Method 900 illustrates sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods. The techniques described in this specification are not limited to performance by one entity or multiple entities operating on one device.

At 902, the BMS 770 compares the amount of charge stored in the first rechargeable battery cell (e.g., 752) to the amount of charge stored in the second rechargeable battery cell (e.g., 754).

At 904, a power management integrated controller 108 (FIG. 1) selects the first (e.g., 780) or the second (e.g., 782) operating state depending on which battery cell has a higher amount of charge stored.

At 906, current from the rechargeable battery cell with the higher amount of charge stored is discharged to the components 104 of the electronic device 102.

At 908, the respective amounts of charge stored in the first and second rechargeable battery cells (e.g., 752, 754) is balanced by operating in the operating state (first or second) that allows for the discharging of the battery cell with the higher amount of charge stored. For example, if the second battery cell (e.g., 754) has a higher amount of charge stored than the first battery cell (e.g., 752), then the battery system 700 operates in the first operating state (e.g., 780) until there is an approximately equal amount of charge stored in the first (e.g., 752) and second (e.g., 754) battery cells. Alternately, if the first battery cell (e.g., 752) has a higher amount of charge stored than the second battery cell (e.g., 754), then the battery system (e.g., 700) operates in the second operating state (e.g., 782) until there is an approximately equal amount of charge stored in the first and second battery cells (e.g., 752, 754).

Although aspects of switched multi-cell battery systems for electronic devices have been described in language specific to features and/or methods, the subject of the appended claims is not necessarily limited to the specific features or methods described. Rather, the specific features and methods are disclosed as example implementations of switched multi-cell battery systems for electronic devices, and other equivalent features and methods are intended to be within the scope of the appended claims. Further, various different aspects are described, and it is to be appreciated that each described aspect can be implemented independently or in connection with one or more other described aspects.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

The following are additional examples of the described apparatuses, methods, and techniques for a switched multi-cell battery system for an electronic device.

Example 1. A switched multi-cell battery system for an electronic device, the switched multi-cell battery system comprising: an input voltage node; an output voltage node; a ground node; a plurality of rechargeable battery cells comprising at least a first rechargeable battery cell with a positive terminal and a negative terminal and a second rechargeable battery cell with a positive terminal and a negative terminal; and a plurality of power control switches comprising at least: a first power control switch having a gate terminal, a first channel terminal coupled to the input voltage node, and a second channel terminal coupled to the positive terminal of the first rechargeable battery cell; a second power control switch having a gate terminal, a first channel terminal coupled to the second channel terminal of the first power control switch, and a second channel terminal coupled to the output voltage node; a third power control switch having a gate terminal, a first channel terminal coupled to the second channel terminal of the second power control switch, and a second channel terminal; a fourth power control switch having a gate terminal, a first channel terminal coupled to the second channel terminal of the third power control switch, and a second channel terminal coupled to the ground node; a fifth power control switch having a gate terminal, a first channel terminal coupled to the input voltage node, and a second channel terminal coupled to the positive terminal of the second rechargeable battery cell; a sixth power control switch having a gate terminal, a first channel terminal coupled to the second channel terminal of the fifth power control switch, and a second channel terminal coupled to the output voltage node; a seventh power control switch having a gate terminal, a first channel terminal coupled to the second channel terminal of the sixth power control switch, and a second channel terminal; and an eighth power control switch having a gate terminal, a first channel terminal coupled to the second channel terminal of the seventh power control switch, and a second channel terminal coupled to the ground node.

Example 2. The switched multi-cell battery system of example 1, wherein: the first channel terminal of the third power control switch is coupled to the output voltage node; and the second channel terminal of the third power control switch is coupled to the negative terminal of the first rechargeable battery cell.

Example 3. The switched multi-cell battery system of example 1, wherein: the first channel terminal of the seventh power control switch is coupled to the output voltage node; and the second channel terminal of the seventh power control switch is coupled to the negative terminal of the second rechargeable battery cell.

Example 4. The switched multi-cell battery system of example 1, further comprising a ninth power control switch having a gate terminal, a first channel terminal coupled to the positive terminal of the first rechargeable battery cell, and a second channel terminal coupled to the second channel terminal of the first power control switch and the first channel terminal of the second power control switch.

Example 5. The switched multi-cell battery system of example 4, further comprising a tenth power control switch having a gate terminal, a first channel terminal coupled to the positive terminal of the second rechargeable battery cell, and a second channel terminal coupled to the second channel terminal of the fifth power control switch and the first channel terminal of the sixth power control switch.

Example 6. The switched multi-cell battery system of example 4 or example 5, wherein the ninth power control switch or the tenth power control switch is implemented as a discharge power control switch to enable or prevent respective current to discharge from the first rechargeable battery cell or the second rechargeable battery cell.

Example 7. The switched multi-cell battery system of example 1, wherein the input voltage node and the output voltage node of the switched multi-cell battery system electrically reference the ground node.

Example 8. The switched multi-cell battery system of example 1, wherein any of the first power control switch through the eighth power control switch are implemented as a transistor, a field-effect transistor (FET), an N-channel (N-FET), or a P-channel FET (P-FET), an n-type metal-oxide-semiconductor (-silicon) field-effect transistor (n-MOSFET), a p-type MOSFET (p-MOSFET), a bipolar junction transistor (BJT), a heterojunction bipolar transistor (HBT), or a junction field-effect transistor (JFET).

Example 9. The switched multi-cell battery system of example 1, further comprising a battery management system, the battery management system comprising: a first operational amplifier having a non-inverting input coupled to the positive terminal of the second rechargeable battery cell, an inverting input coupled to the ground node, and an output coupled to a first input of a multiplexer; a second operational amplifier having a non-inverting input coupled to the positive terminal of the first rechargeable battery cell, an inverting input coupled to the ground node, and an output coupled to a second input of the multiplexer; and a third operational amplifier having a non-inverting input coupled to a first output of the multiplexer, an inverting input coupled to a second output of the multiplexer; and an output coupled to a power management entity of the electronic device.

Example 9a. The switched multi-cell battery system of any one of examples 1 to 9 may further comprise a power management controller, the power management controller configured to: during a first phase of a duty cycle, control the plurality of current control switches effective to (i) couple the first and second rechargeable battery cells in series between the input voltage node and the ground node and (ii) couple the second rechargeable battery cell between the output voltage node and the ground node; and during a second phase of the duty cycle, control the plurality of current control switches effective to (i) couple the first and second rechargeable battery cells in series between the input voltage node and the ground node and (ii) couple the first rechargeable battery cell between the output voltage node and the ground node.

Example 10. A switched multi-cell battery system for an electronic device, the switched multi-cell battery system comprising: an input voltage node; an output voltage node; a ground node; a plurality of rechargeable battery cells comprising at least a first rechargeable battery cell with a positive terminal and a negative terminal and a second rechargeable battery cell with a positive terminal and a negative terminal; a plurality of power control switches comprising at least: a first power control switch having a gate terminal, a first channel terminal coupled to the input voltage node, and a second channel terminal coupled to the positive terminal of the first rechargeable battery cell; a second power control switch having a gate terminal, a first channel terminal coupled to the second channel terminal of the first power control switch, and a second channel terminal coupled to the output voltage node; third and fourth power control switches coupled between the second channel terminal of the second power control switch and the ground node; a fifth power control switch having a gate terminal, a first channel terminal coupled to the input voltage node, and a second channel terminal coupled to the positive terminal of the second rechargeable battery cell; a sixth power control switch having a gate terminal, a first channel terminal coupled to the second channel terminal of the fifth power control switch, and a second channel terminal coupled to the output voltage node; seventh and eighth power control switches coupled between the second channel terminal of the sixth power control switch and the ground node. The switched multi-cell battery system of this example may optionally further include a power management integrated controller, the power management integrated controller configured to: during a first phase of a duty cycle, control the plurality of power control switches effective to (i) couple the first and second rechargeable battery cells in series between the input voltage node and the ground node and (ii) couple the second rechargeable battery cell between the output voltage node and the ground node; and during a second phase of the duty cycle, control the plurality of power control switches effective to (i) couple the first and second rechargeable battery cells in series between the input voltage node and the ground node and (ii) couple the first rechargeable battery cell between the output voltage node and the ground node.

Example 11. The switched multi-cell battery system of example 10, wherein: the third power control switch includes a gate terminal, a first channel terminal coupled to the second channel terminal of the second power control switch, and a second channel terminal; the fourth power control switch includes a gate terminal, a first channel terminal coupled to the second channel terminal of the third power control switch, and a second channel terminal coupled to the ground node; the seventh power control switch includes a gate terminal, a first channel terminal coupled to the second channel terminal of the sixth power control switch, and a second channel terminal; and the eighth power control switch includes a gate terminal, a first channel terminal coupled to the second channel terminal of the seventh power control switch, and a second channel terminal coupled to the ground node.

Example 12. The switched multi-cell battery system of example 10, wherein the input voltage node and the output voltage node of the switched multi-cell battery system electrically reference the ground node.

Example 13. The switched multi-cell battery system of example 10, wherein the first phase of the duty cycle establishes a first operating state in which: when the switched multi-cell battery system is coupled to an external power adapter, the external power adapter charges the first and second rechargeable battery cells, and the second rechargeable battery cell discharges to components of the electronic device that are coupled to the output voltage node; and when the switched multi-cell battery system is not coupled to the external power adapter, the second rechargeable battery cell discharges to the components of the electronic device.

Example 14. The switched multi-cell battery system of example 10, wherein the second phase of the duty cycle establishes a second operating state in which: when the switched multi-cell battery system is coupled to the external power adapter, the external power adapter charges the first and second rechargeable battery cells, and the first rechargeable battery cell discharges to the components of the electronic device that are coupled to the output voltage node; and when the switched multi-cell battery system is not coupled to the external power adapter, the first rechargeable battery cell discharges to the components of the electronic device.

Example 15. The switched multi-cell battery system of example 10, further comprising: a ninth power control switch having a gate terminal, a first channel terminal coupled to the positive terminal of the first rechargeable battery cell, and a second channel terminal coupled to the second channel terminal of the first power control switch and the first channel terminal of the second power control switch; and a tenth power control switch having a gate terminal, a first channel terminal coupled to the positive terminal of the second rechargeable battery cell, and a second channel terminal coupled to the second channel terminal of the fifth power control switch and the first channel terminal of the sixth power control switch.

Example 16. The switched multi-cell battery system of example 10, further comprising a battery management system comprising: a first operational amplifier configured to reference the positive terminal of the second rechargeable battery cell to the ground node to produce a first voltage potential Va; a second operational amplifier configured to reference the positive terminal of the first rechargeable battery cell to the ground node to produce a second voltage potential Vb; a multiplexer configured to select between the first voltage potential Va produced by the first operating amplifier and the second voltage potential Vb produced by the second operational amplifier to produce a first multiplexer output and a second multiplexer output; and a third operational amplifier configured to reference the first multiplexer output to the second multiplexer output to produce a third voltage potential Vc.

Example 17. The switched multi-cell battery system of example 10, wherein: the plurality of rechargeable battery cells further comprises a third rechargeable battery cell; the plurality of power control switches includes at least four additional power control switches by which the third rechargeable battery cell is coupled to the input voltage node, the output voltage node, and the ground node; and the power management integrated controller is further configured to: during the first phase of the duty cycle, control the plurality of power control switches effective to (i) couple the plurality of the rechargeable battery cells in series between the input voltage node and the ground node and (ii) couple the third rechargeable battery cell between the output voltage node and the ground node; and during the second phase of the duty cycle, control the plurality of power control switches effective to (i) couple the plurality of the rechargeable battery cells in series between the input voltage node and the ground node and (ii) couple the first or the second rechargeable battery cell between the output voltage node and the ground node.

Example 18. A method for charging and discharging a switched multi-cell battery system, the method comprising: closing, based on a first phase of a duty cycle, each of a first plurality of power control switches to enable flow of current as part of establishing a first operating state; opening, based on the first phase of the duty cycle, each of a second plurality of power control switches to disable flow of current as part of establishing the first operating state in which: electrical power from an external power adapter charges a first rechargeable battery cell and a second rechargeable battery cell that are connected, by at least one of the first plurality of power control switches, in series between an input voltage node and a ground node, and charge stored in the second battery rechargeable cell flows, through at least one of the first plurality of power control switches, to components of an electronic device; closing, based on a second phase of the duty cycle, each of the second plurality of power control switches to enable flow of current as part of establishing a second operating state; opening, based on a second phase of the duty cycle, each of the first plurality of power control switches to disable flow of current as part of establishing the second operating state in which: electrical power from the external power adapter charges the second rechargeable battery cell and the first rechargeable battery cell that are connected, by at least one of the second plurality of power control switches, in series between the input voltage node and the ground node, and charge stored in the first rechargeable battery cell flows, through at least one of the second plurality of power control switches, to the components of the electronic device.

Example 19. The method of example 18, further comprising: comparing, with a battery management system, an amount of charge stored in the first rechargeable battery cell to an amount of charge stored in the second rechargeable battery cell; selecting, using a power management integrated controller, the first operating state or the second operating state; discharging, to the components of the electronic device, the rechargeable battery cell with a higher amount of charge stored; and balancing the respective amounts of charge stored in the first rechargeable battery cell and the second rechargeable battery cell.

Example 20. The method of example 18, wherein establishing the first operating state and the second operating state is effective to down-convert an input voltage received by the switched multi-cell battery system to an output voltage out of the switched multi-cell battery system and creating an input-to-output voltage conversion ratio such that: the input-to-output voltage conversion ratio is approximately equal to the number rechargeable battery cells in a plurality of rechargeable battery cells; and the plurality of rechargeable battery cells may comprise two or more rechargeable battery cells.

What is claimed is:

1. A switched multi-cell battery system for an electronic device, the switched multi-cell battery system comprising:
    an input voltage node;
    an output voltage node;
    a ground node;
    a plurality of rechargeable battery cells comprising at least a first rechargeable battery cell with a positive terminal and a negative terminal and a second rechargeable battery cell with a positive terminal and a negative terminal; and
    a plurality of power control switches comprising at least:
        a first power control switch having a gate terminal, a first channel terminal coupled to the input voltage node, and a second channel terminal coupled to the positive terminal of the first rechargeable battery cell;
        a second power control switch having a gate terminal, a first channel terminal coupled to the second channel terminal of the first power control switch and the positive terminal of the first rechargeable battery cell, and a second channel terminal coupled to the output voltage node;
        a third power control switch having a gate terminal, a first channel terminal coupled to the second channel terminal of the second power control switch and the positive terminal of the second rechargeable battery cell, and a second channel terminal coupled to the negative terminal of the first rechargeable battery cell; and
        a fourth power control switch having a gate terminal, a first channel terminal coupled to the second channel terminal of the third power control switch, and a second channel terminal coupled to the ground node and the negative terminal of the second rechargeable battery cell.

2. The switched multi-cell battery system of claim 1, wherein:
    the first channel terminal of the third power control switch is coupled to the output voltage node; or
    the second channel terminal of the third power control switch is coupled to the positive terminal of the second rechargeable battery cell.

3. The switched multi-cell battery system of claim 1, further comprising:
    a fifth power control switch having a gate terminal, a first channel terminal coupled to the positive terminal of the first rechargeable battery cell, and a second channel terminal coupled to the second channel terminal of the first power control switch and the first channel terminal of the second power control switch.

4. The switched multi-cell battery system of claim 3, further comprising:
    a sixth power control switch having a gate terminal, a first channel terminal coupled to the positive terminal of the second rechargeable battery cell, and a second channel terminal coupled to the second channel terminal of the second power control switch and the first channel terminal of the third power control switch.

5. The switched multi-cell battery system of claim 4, further comprising:
    a seventh power control switch having a gate terminal, a first channel terminal coupled to the negative terminal of the second rechargeable battery cell, and a second channel terminal coupled to the second channel terminal of the fourth power control switch and the ground node.

6. The switched multi-cell battery system of claim 4, wherein the fifth power control switch or the sixth power control switch is implemented as a discharge power control switch to enable or prevent respective current to discharge from the first rechargeable battery cell or the second rechargeable battery cell.

7. The switched multi-cell battery system of claim 1, wherein the input voltage node and the output voltage node of the switched multi-cell battery system electrically reference the ground node.

8. The switched multi-cell battery system of claim 5, wherein any of the first power control switch through the seventh power control switch are implemented as a transistor, a field-effect transistor (FET), an N-channel FET (N-FET), or a P-channel FET (P-FET), an n-type metal-oxide-semiconductor (-silicon) field-effect transistor (n-MOSFET), a p-type MOSFET (p-MOSFET), a bipolar junction transistor (BJT), a heterojunction bipolar transistor (HBT), or a junction field-effect transistor (JFET).

9. The switched multi-cell battery system of claim 1, further comprising:
a power management integrated controller, the power management integrated controller configured to:
during a first phase of a duty cycle, control the plurality of power control switches effective to (i) couple the first and second rechargeable battery cells in series between the input voltage node and the ground node and (ii) couple the second rechargeable battery cell between the output voltage node and the ground node; and
during a second phase of the duty cycle, control the plurality of power control switches effective to couple the first and second rechargeable battery cells in parallel between the output voltage node and the ground node.

10. The switched multi-cell battery system of claim 9, wherein the first phase of the duty cycle establishes a first operating state in which:
when the switched multi-cell battery system is coupled to an external power adapter, the external power adapter charges the first and second rechargeable battery cells, and the second rechargeable battery cell discharges to components of the electronic device that are coupled to the output voltage node; and
when the switched multi-cell battery system is not coupled to the external power adapter, the second rechargeable battery cell discharges to the components of the electronic device.

11. The switched multi-cell battery system of claim 9, wherein the second phase of the duty cycle establishes a second operating state in which:
when the switched multi-cell battery system is not coupled to an external power adapter via the input voltage node, the first rechargeable battery cell and the second rechargeable battery cell are coupled in parallel to discharge current to components of the electronic device.

12. A method for operating a multi-cell battery system comprising a first rechargeable battery cell, a second rechargeable battery cell, and power control switches, the method comprising:
closing a first one of the power control switches to couple an input voltage node of the multi-cell battery system to a positive terminal of the first rechargeable battery cell, the first power control switch having a gate terminal, a first channel terminal coupled to the input voltage node, and a second channel terminal coupled to the positive terminal of the first rechargeable battery cell;
opening a second one of the power control switches to decouple the positive terminal of the first rechargeable battery cell from an output voltage node of the multi-cell battery system, the second power control switch having a gate terminal, a first channel terminal coupled to the second channel terminal of the first power control switch and the positive terminal of the first rechargeable battery cell, and a second channel terminal coupled to the output voltage node;
closing a third one of the power control switches to couple a negative terminal of the first rechargeable battery cell to a positive terminal of the second rechargeable battery cell, the third power control switch having a gate terminal, a first channel terminal coupled to the negative terminal of the first rechargeable battery cell, and a second channel terminal coupled to the positive terminal of the second rechargeable battery cell and the second channel terminal of the second power control switch; and
opening a fourth one of the power control switches to decouple the negative terminal of the first battery from a ground node and a negative terminal of the second rechargeable battery cell, the fourth power control switch having a gate terminal, a first channel terminal coupled to the second channel terminal of the third power control switch and negative terminal of the first rechargeable battery cells, and a second channel terminal coupled to the ground node and the negative terminal of the second rechargeable battery cell.

13. The method of claim 12, wherein closing the first power control switch and the third power control switch and opening the second power control switch and the fourth power control switch operates the multi-cell battery system in a charging mode.

14. The method of claim 13, wherein the charging mode comprises charging the first rechargeable battery cell and the second rechargeable battery cell in a series cell configuration from the input voltage node of the multi-cell battery system.

15. The method of claim 12, further comprising:
closing a fifth one of the power control switches to couple the positive terminal of the first rechargeable battery cell to the second channel terminal of the first power control switch, the fifth power control switch disposed between the positive terminal of the first rechargeable battery cell and the second channel terminal of the first power control switch; or
closing a sixth one of the power control switches to couple the positive terminal of the second rechargeable battery cell to the negative terminal of the first rechargeable battery cell via the third power control switch, the sixth power control switch disposed between the positive terminal of the second rechargeable battery cell and the second channel terminal of the third power control switch.

16. The method of claim 12, further comprising:
opening the first power control switch to decouple the input voltage node from the positive terminal of the first rechargeable battery cell;
closing the second power control switch to couple the positive terminal of the first rechargeable battery cell to the output voltage node and the positive terminal of the second rechargeable battery cell;
opening the third power control switch to decouple the negative terminal of the first rechargeable battery cell from the positive terminal of the second rechargeable battery cell; and
closing the fourth power control switch to couple the negative terminal of the first battery to the ground node and the negative terminal of the second rechargeable battery cell.

17. The method of claim 16, wherein opening the first power control switch and the third power control switch and closing the second power control switch and the fourth power control switch operates the multi-cell battery system in a discharge mode.

18. The method of claim 17, wherein the discharge mode comprises discharging the first rechargeable battery cell and the second rechargeable battery cell in a parallel cell configuration to the output voltage node of the multi-cell battery system.

19. The method of claim 16, further comprising:
closing a fifth one of the power control switches to couple the positive terminal of the first rechargeable battery cell to the second channel terminal of the first power control switch, the fifth power control switch disposed between the positive terminal of the first rechargeable battery cell and the second channel terminal of the first power control switch; or closing a sixth one of the power control switches to couple the positive terminal of the second rechargeable battery cell to the output voltage node, the sixth power control switch disposed between the positive terminal of the second rechargeable battery cell and the output voltage node.

20. The method of claim 19, further comprising:

closing a seventh one of the power control switches to couple the negative terminal of the second rechargeable battery cell to the ground node, the seventh power control switch disposed between the negative terminal of the second rechargeable battery cell and the ground node.

\* \* \* \* \*